US012701579B2

(12) United States Patent (10) Patent No.: US 12,701,579 B2
Park et al. (45) Date of Patent: Aug. 4, 2026

(54) METHOD AND DEVICE FOR GRANT-FREE DATA TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Hyunseok Ryu, Suwon-si (KR); Jonghyun Bang, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/467,298

(22) Filed: Sep. 14, 2023

(65) Prior Publication Data

US 2024/0023118 A1 Jan. 18, 2024

Related U.S. Application Data

(63) Continuation of application No. 17/878,420, filed on Aug. 1, 2022, now Pat. No. 12,022,488, which is a (Continued)

(30) Foreign Application Priority Data

Dec. 28, 2018 (KR) ........................ 10-2018-0172552
Dec. 2, 2019 (KR) ........................ 10-2019-0158361

(51) Int. Cl.
*H04W 72/12* (2023.01)
*H04L 1/1829* (2023.01)
*H04W 72/23* (2023.01)

(52) U.S. Cl.
CPC ........... *H04W 72/23* (2023.01); *H04L 1/1861* (2013.01)

(58) Field of Classification Search
CPC ... H04W 72/23; H04W 72/11; H04W 72/115; H04W 72/1273; H04W 72/21;
(Continued)

(56) References Cited

U.S. PATENT DOCUMENTS 10,404,438 B2 * 9/2019 Park ...................... H04L 1/0073
11,405,907 B2 * 8/2022 Park ...................... H04W 72/23
(Continued)

FOREIGN PATENT DOCUMENTS

WO 2017-078454 A1 5/2017
WO 2017-192025 A1 11/2017
(Continued)

OTHER PUBLICATIONS

International Search Report dated Apr. 6, 2020, issued in an International Application No. PCT/KR2019/018679.
(Continued)

*Primary Examiner* — John D Blanton
(74) *Attorney, Agent, or Firm* — Jefferson IP Law, LLP

(57) ABSTRACT

A communication technique and a system thereof for converging an Internet of Things (IoT) technology and a 5th generation (5G) communication system for supporting a high data transmission rate beyond that of a 4th generation (4G) system are provided. The disclosure may be applied to intelligent services, such as smart homes, smart buildings, smart cities, smart cars or connected cars, health care, digital education, retail, and security and safety related services, on the basis of 5G communication technologies and IoT-related technologies. The disclosure provides a method and device for transmitting or receiving a plurality of dynamic scheduling-based and/or grant-free based data, and reporting
(Continued)

feedback information relating to the plurality of data, in a wireless communication system.

16 Claims, 13 Drawing Sheets

Related U.S. Application Data continuation of application No. 16/728,438, filed on Dec. 27, 2019, now Pat. No. 11,405,907.

(58) Field of Classification Search
CPC ... H04L 1/1861; H04L 1/1614; H04L 1/1822; H04L 1/1829; H04L 1/1887; H04L 1/1896; H04L 1/1812; H04L 1/1864; H04L 5/0053
See application file for complete search history.

(56) References Cited

U.S. PATENT DOCUMENTS

| | | | | |
|---|---|---|---|---|
| 12,022,488 | B2 * | 6/2024 | Park | H04L 1/1614 |
| 12,200,733 | B2 * | 1/2025 | He | H04W 72/044 |
| 2010/0074231 | A1 * | 3/2010 | Hsu | H04W 72/21 370/336 |
| 2011/0243066 | A1 * | 10/2011 | Nayeb Nazar | H04L 5/0055 370/328 |
| 2013/0242923 | A1 * | 9/2013 | Yang | H04L 5/001 370/329 |
| 2013/0315124 | A1 * | 11/2013 | Rapaport | H04W 72/23 370/312 |
| 2015/0181576 | A1 * | 6/2015 | Papasakellariou | H04L 1/08 370/329 |
| 2015/0208269 | A1 * | 7/2015 | Damnjanovic | H04L 5/0098 370/252 |
| 2016/0226630 | A1 * | 8/2016 | Zhang | H04L 1/1864 |
| 2017/0273056 | A1 * | 9/2017 | Papasakellariou | H04W 52/44 |
| 2018/0241510 | A1 * | 8/2018 | Shen | H04L 1/18 |
| 2018/0262302 | A1 * | 9/2018 | Bergström | H04L 1/1896 |
| 2018/0324772 | A1 * | 11/2018 | Babaei | H04L 5/00 |
| 2019/0028242 | A1 * | 1/2019 | Xiao | H04W 72/23 |
| 2019/0174327 | A1 * | 6/2019 | You | H04W 4/70 |
| 2019/0223205 | A1 * | 7/2019 | Papasakellariou | H04L 5/00 |
| 2019/0342040 | A1 * | 11/2019 | Tiirola | H04L 5/0055 |
| 2019/0357198 | A1 * | 11/2019 | Xiong | H04W 72/51 |
| 2019/0363843 | A1 * | 11/2019 | Gordaychik | H04L 1/1896 |
| 2019/0387501 | A1 * | 12/2019 | Park | H04L 5/005 |
| 2020/0015256 | A1 * | 1/2020 | Lee | H04W 72/1268 |
| 2020/0067650 | A1 * | 2/2020 | Kim | H04W 4/40 |
| 2020/0078909 | A1 * | 3/2020 | Park | H04W 36/0016 |
| 2020/0099475 | A1 * | 3/2020 | Amuru | H04L 1/1887 |
| 2020/0106566 | A1 * | 4/2020 | Yeo | H04L 1/1812 |
| 2020/0106569 | A1 * | 4/2020 | Tsai | H04W 72/23 |
| 2020/0137695 | A1 * | 4/2020 | Papasakellariou | H04W 52/08 |
| 2020/0145167 | A1 * | 5/2020 | Jung | H04L 1/1861 |
| 2020/0187170 | A1 * | 6/2020 | Shin | H04L 27/2666 |
| 2020/0205141 | A1 * | 6/2020 | Khoshnevisan | H04L 5/0055 |
| 2020/0213044 | A1 * | 7/2020 | Peng | H04L 1/1864 |
| 2020/0213981 | A1 * | 7/2020 | Park | H04W 72/23 |
| 2020/0228289 | A1 * | 7/2020 | He | H04L 1/1861 |
| 2020/0280397 | A1 * | 9/2020 | Gao | H04L 5/0055 |
| 2020/0344010 | A1 * | 10/2020 | Lei | H04W 72/0446 |
| 2020/0374043 | A1 * | 11/2020 | Lei | H04L 1/1845 |
| 2020/0374045 | A1 * | 11/2020 | Yin | H04L 1/1854 |
| 2021/0021386 | A1 * | 1/2021 | Gao | H04L 1/1819 |
| 2021/0037554 | A1 * | 2/2021 | Kim | H04L 5/0092 |
| 2021/0050948 | A1 * | 2/2021 | Gao | H04L 1/1812 |
| 2021/0075558 | A1 * | 3/2021 | Takeda | H04W 72/23 |
| 2021/0084650 | A1 * | 3/2021 | Fan | H04L 5/0098 |
| 2021/0120537 | A1 * | 4/2021 | Lei | H04L 1/1893 |
| 2021/0135793 | A1 * | 5/2021 | Xiao | H04L 1/1861 |
| 2021/0160013 | A1 * | 5/2021 | Kim | H04B 7/024 |
| 2021/0219329 | A1 * | 7/2021 | Zhou | H04L 1/1819 |
| 2021/0282182 | A1 * | 9/2021 | Nogami | H04W 74/08 |
| 2021/0314100 | A1 * | 10/2021 | Yeo | H04W 72/0453 |
| 2021/0344455 | A1 * | 11/2021 | Choi | H04L 1/1614 |
| 2021/0377912 | A1 * | 12/2021 | El Hamss | H04L 1/1819 |
| 2022/0029746 | A1 * | 1/2022 | Noh | H04L 1/1812 |
| 2022/0039138 | A1 * | 2/2022 | Takeda | H04W 72/23 |
| 2022/0053537 | A1 * | 2/2022 | Lei | H04L 1/1822 |
| 2022/0377717 | A1 * | 11/2022 | Park | H04W 72/23 |
| 2024/0023118 | A1 * | 1/2024 | Park | H04L 1/1861 |

FOREIGN PATENT DOCUMENTS

| | | |
|---|---|---|
| WO | 2018/204344 A1 | 11/2018 |
| WO | 2020/139050 A1 | 7/2020 |

OTHER PUBLICATIONS

Fujitsu, 'Draft CR on Maintenance of HARQ-ACK transmission', R1-1812445, 3GPP TSG RAN WG1 Meeting #95, Nov. 2, 2018, Spokane, USA. section 9.1.2.

Samsung, 'Draft CR to 38.213 capturing correction to Type 1 HARQ-ACK codebook', R1-1814331, 3GPP TSG RAN WG1 Meeting #95, Nov. 19, 2018, Spokane, USA. p. 1; and section 9.1.2.1.

Huawei et al., 'Remaining issues for dynamic HARQ-ACK codebook determination', R1-156452, 3GPP TSG RAN WG1 Meeting #83, Nov. 7, 2015, Anaheim, USA. section 2.2.2; and figure 2.

European Search Report dated Jun. 27, 2022, issued in European Application No. 19905861.1.

Huawei et al.; Remaining issues on HARQ management; 3GPP TSG RAN WG1 Meeting #92; R1-1802697; Athens, Greece; Feb. 26-Mar. 2, 2018; Feb. 17, 2018.

Korean Notice of Allowance with English translation dated Nov. 14, 2024; Korean Appln. No. 10-2019-0158361.

U.S. Notice of Allowance dated Feb. 14, 2024; U.S. Appl. No. 17/878,420.

* cited by examiner

Frequency

Slot #n
[802]

Slot #n+1
[804]

Slot #n+2
[806]

Slot #k
[808]

Time

METHOD AND DEVICE FOR GRANT-FREE DATA TRANSMISSION IN WIRELESS COMMUNICATION SYSTEM

CROSS-REFERENCE TO RELATED APPLICATION(S)

This application is a continuation application of prior application Ser. No. 17/878,420, filed on Aug. 1, 2022, which is a continuation application of prior application Ser. No. 16/728,438, filed on Dec. 27, 2019, which has issued as U.S. Pat. No. 11,405,907 on Aug. 2, 2022, and which is based on claims priority under 35 U.S.C. § 119(a) of a Korean patent application number 10-2018-0172552, filed on Dec. 28, 2018, in the Korean Intellectual Property Office and of a Korean patent application number 10-2019-0158361, filed on Dec. 2, 2019, in the Korean Intellectual Property Office, the disclosure of each of which is incorporated by reference herein in its entirety.

BACKGROUND

1. Field

The disclosure relates to a method for grant-free based data transmission in a wireless communication system.

2. Description of Related Art

In order to meet wireless data traffic demands that have increased after 4th generation (4G) communication system commercialization, efforts to develop an improved 5th generation (5G) communication system or a pre-5G communication system have been made. For this reason, the 5G communication system or the pre-5G communication system is called a beyond 4G network communication system or a post long term evolution (LTE) system. The 5G communication system defined by 3rd generation partnership project (3GPP) is called a new radio (NR) system. In order to achieve a high data transmission rate, an implementation of the 5G communication system in a mmWave band (for example, 60 GHz band) is being considered. In order to mitigate a propagation path loss in the mmWave band and increase a propagation transmission distance, in the 5G communication system, technologies such as beamforming, massive multiple input and multiple output (MIMO), full dimensional MIMO (FD-MIMO), array antenna, analog beam-forming, and large scale antenna have been discussed, and applied to the NR system. Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network. In addition, the 5G system has resulted in the development of hybrid frequency shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access technologies, and the like.

Meanwhile, the Internet has been evolved to an Internet of Things (IoT) network in which distributed components, such as objects, exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for human life may be provided. The IoT may be applied to fields, such as a smart home, smart building, smart city, smart car, connected car, smart grid, health care, smart home appliance, or high-tech medical service, through the convergence of the conventional Information technology (IT) and various industries.

Accordingly, various attempts to apply the 5G communication to the IoT network are made. For example, the 5G communication technology, such as a sensor network, M2M communication, and MTC, has been implemented by a technique, such as beamforming, MIMO, and array antennas. The application of a cloud RAN as the big data processing technology may be an example of convergence of the 5G technology and the IoT technology.

5G communication systems are being developed to provide services according to the needs of various users, and, as a method for providing these various services, data transmission based on dynamic scheduling as well as grant-free based data transmission are being studied.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for controlling a plurality of data transmissions for various services to effectively perform data transmission.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, at least one downlink data on a physical downlink shared channel (PDSCH), generating a HARQ-ACK (hybrid automatic repeat request-acknowledgement) codebook including at least one HARQ-ACK bit corresponding to at least one downlink data, wherein the HARQ-ACK codebook is based on at least one of a priority of downlink data or an index of downlink data in case that the downlink data is associated with a semi-persistent scheduling (SPS), and transmitting, to the base station, the HARQ-ACK codebook on an uplink channel.

In accordance with another aspect of the present disclosure, a method performed by a base station in a communication system is provided. The method includes transmitting, to a terminal, at least one downlink data on a physical downlink shared channel (PDSCH), and receiving, from the terminal, an HARQ-ACK (hybrid automatic repeat request-acknowledgement) codebook on an uplink channel, wherein the HARQ-ACK codebook includes at least one HARQ-ACK bit corresponding to at least one downlink data, and wherein the HARQ-ACK codebook is based on at least one of a priority of downlink data or an index of downlink data in case that the downlink data is associated with a semi-persistent scheduling (SPS).

In accordance with another aspect of the present disclosure, a terminal in a wireless communication system is provided. The terminal includes a transceiver and a controller configured to receive, from a base station via the transceiver, at least one downlink data on a physical downlink shared channel (PDSCH), generate a HARQ-ACK (hybrid automatic repeat request-acknowledgement) codebook including at least one HARQ-ACK bit corresponding to at least one downlink data, wherein the HARQ-ACK codebook is based on at least one of a priority of downlink data or an index of downlink data in case that the downlink data is associated with a semi-persistent scheduling (SPS), and transmit, to the base station via the transceiver, the HARQ-ACK codebook on an uplink channel.

In accordance with another aspect of the present disclosure, a base station in a wireless communication system is provided. The base station includes a transceiver and a controller configured to transmit, to a terminal, at least one downlink data on a physical downlink shared channel (PDSCH), and receive, from the terminal, an HARQ-ACK (hybrid automatic repeat request-acknowledgement) codebook on an uplink channel, wherein the HARQ-ACK codebook includes at least one HARQ-ACK bit corresponding to at least one downlink data, and wherein the HARQ-ACK codebook is based on at least one of a priority of downlink data or an index of downlink data in case that the downlink data is associated with a semi-persistent scheduling (SPS).

According to the disclosure, it is possible to effectively control a plurality of data transmissions and to effectively report feedback information for the plurality of data transmissions.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS it's the above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
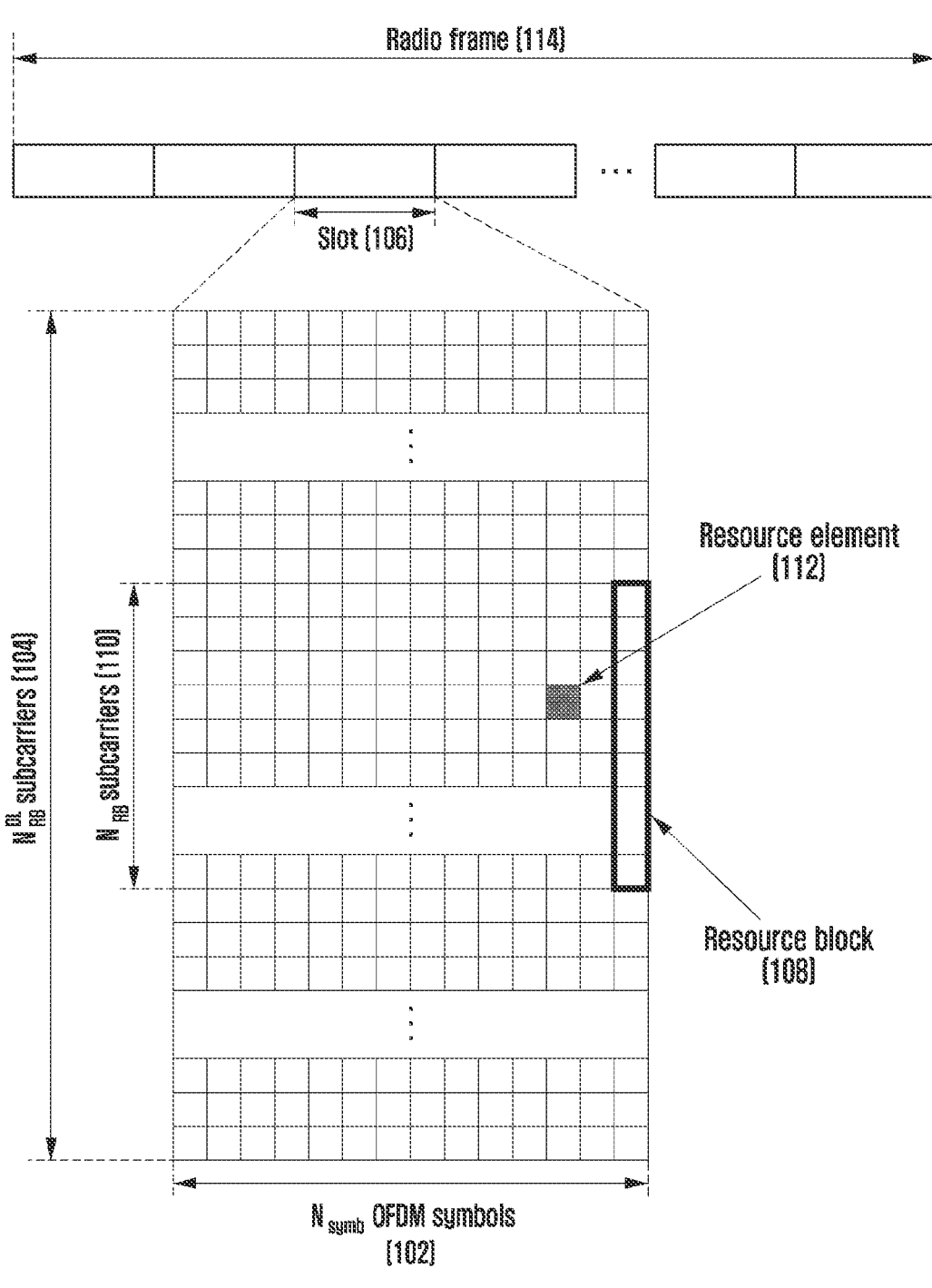
FIG. 1 is a diagram illustrating a transmission structure in a time-frequency domain, that is, a radio resource region of a 5th generation (5G) or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element does not entirely reflect the actual size. In each figure, the same reference numerals are assigned to the same or corresponding elements.

The advantages and features of the disclosure and ways to achieve them will be apparent by making reference to embodiments as described below in detail in conjunction with the accompanying drawings. However, the disclosure is not limited to embodiments provided hereinafter, and may be implemented in various different forms. Embodiments are provided merely to make the disclosure complete and to fully convey the scope of the disclosure to those skilled in the art. The disclosure is only defined by the scope of the claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Further, each block of the flowchart illustrations may represent a module, segment, or part of a code, which includes one or more executable instructions for implementing the specified logical function(s). It should also be noted that the functions noted in the blocks may occur out of the order in some alternative implementations. For example, two blocks shown in succession may in fact be executed substantially concurrently or the blocks may sometimes be executed in the reverse order, depending upon the functionality involved.

The term "-unit" used in the embodiments refers to software or a hardware element, such as a field programmable gate array (FPGA) or an application specific integrated circuit (ASIC), and a "-unit" performs certain roles. However, the "-unit" does not always have a meaning limited to software or hardware. The "-unit" may be configured either to be stored in an addressable storage medium or to execute one or more processors. Therefore, the "-unit" includes, for example, software elements, object-oriented software elements, class elements and task elements, processes, functions, properties, procedures, sub-routines, segments of a program code, drivers, firmware, micro-codes, circuits, data, database, data structures, tables, arrays, and parameters. Elements and functions provided by the "-unit" may be either combined into a smaller number of elements and the "-units" or divided into a larger number of elements and the "-units". Moreover, elements and the "-unit" may be implemented to reproduce one or more central processing units (CPUs) within a device or a security multimedia card. Also, in an embodiment, "-unit" may include one or more processors.

A wireless communication system has developed to be a broadband wireless communication system that provides a high speed and high quality packet data service, as the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra-mobile broadband (UMB), and 802.16e of IEEE, or the like, beyond the voice-based service provided at the initial stage. Further, communication standards for 5th generation (5G) or new radio (NR) are generated on the basis of 5th generation wireless communication system.

In the 5G or NR system, which is a typical example of a broadband wireless communication system, an orthogonal frequency division multiplexing (OFDM) scheme is adopted in downlink (DL) and uplink (UL). In detail, a cyclic-prefix OFDM (CP-OFDM) scheme is adopted in downlink, and a discrete Fourier transform spreading OFDM (DFT-S-OFDM) scheme is adopted in addition to the CP-OFDM in uplink. Uplink refers to a radio link through which a terminal transmits data or a control signal to a base station, and downlink refers to a radio link through which a base station transmits data or a control signal to a terminal. In a multiple access scheme, in general, data or control information of each user is distinguished by assigning and operating time-frequency resources, at which data or control information of each user is transmitted, so as not to overlap each other, that is, to establish orthogonality.

The 5G or NR system adopts a hybrid automatic repeat request (HARQ) scheme in which corresponding data is retransmitted in a physical layer when a decoding failure occurs in initial transmission. In the HARQ scheme, when a receiver fails to correctly decode data, the receiver transmits negative acknowledgement (NACK) informing of a transmitter of a decoding failure by the receiver so as to enable the transmitter to retransmit the data in a physical layer. The receiver improves data reception performance, by combining the data retransmitted by the transmitter with the data. Also, when data is accurately decoded, the receiver may transmit, to the transmitter, an acknowledgement (ACK) notifying that decoding is successfully executed, so that the transmitter transmits new data.

The NR access technology system, i.e., new 5G communication, is designed so that various services are freely multiplexed in time and frequency resources, and accordingly, a waveform, numerology, a reference signal, etc., may be assigned dynamically or freely according to the needs of corresponding services. In order to provide an optimal service to a terminal in wireless communication, optimization data transmission by measurement of an interference amount and a channel quality is important, and therefore accurate channel state measurement is important. However, unlike 4th generation (4G) communication, in which channel and interference characteristics do not change significantly according to frequency resources, in the case of 5G or NR channels, because channel and interference characteristics vary significantly depending on services, it should support a subset of a frequency resource group (FRG) level, which enables measurement by division. In the 5G or NR system, types of supported services may be divided into categories, such as enhanced mobile broadband (eMBB), massive MTC (mMTC), and ultra-reliable and low-latency communications (URLLC). The eMBB is a service aimed at high speed transmission of high capacity data, the mMTC is a service aimed at minimizing a terminal power and accessing multiple terminals, and the URLLC is a service aimed at high reliability and low latency. Different requirements may be applied depending on types of services applied to the terminal.

Among the above-mentioned services, because a URLLC service aims at high reliability and low latency, there may be a need to transmit control information and data information, which may be transmitted on a physical channel at a low coding rate. In the case of control information, a function of repetitive transmission of control information has been already introduced in MTC or narrow band Internet-of-Things (NB-IoT) services. The purpose of adopting control information repetitive transmission is to provide high coverage for terminals having a small bandwidth, wherein a latency time is not sufficiently considered. A minimum unit of the control information repetitive transmission is fixed in units of subframes on the basis of LTE. In order to support the URLLC service in the NR or 5G system, it should adopt a control information repetitive transmission mode that may improve reliability while requiring a shorter latency time. Therefore, the disclosure basically considers a situation in which control information is repetitively transmitted at a slot. In addition, a situation where control information is repetitively transmitted, which may be performed beyond a slot boundary, may also be considered.

In the disclosure, terms are defined in consideration of respective functions, and may vary depending on an intention or usage of users or operators. Therefore, definitions of terms should be made on the basis of contents throughout the specification. Hereinafter, a base station is a subject that performs resource assignment to a terminal, and may be at least one of a gNode B (gNB), an eNode B (eNB), a Node B, a base station (BS), a radio access unit, a base station controller, or a node on a network. A terminal may include a user equipment (UE), a mobile station (MS), a cellular phone, a smart phone, a computer, or a multimedia system capable of performing a communication function. Hereinafter, in the disclosure, the NR system is described as an example, but the disclosure is not limited thereto. Embodiments of the disclosure may be applied to various communication systems having a similar technical background or channel form. Also, embodiments of the disclosure may be modified without departing from the scope of the disclosure, and may be applied to other communication systems, on the basis of determination by those skilled in the art.

In the disclosure, the terms of physical channel and signal may be used interchangeably with data or a control signal. For example, although a physical downlink shared channel (PDSCH) is a physical channel through which data is transmitted, the PDSCH may be referred to as data in the disclosure.

In the disclosure, higher signaling (which may be used interchangeably with higher layer signaling, higher signal, and higher layer signal) is a method of transferring a signal from a base station to a terminal through a physical downlink data channel, or a method of transferring a signal from a terminal to a base station through a physical uplink data channel, and may also be referred to as radio resource control (RRC) signaling or medium access control (MAC)

control element (CE). Further, layer 1 (L1) signaling is a signal transfer method of transferring a signal on downlink or uplink through a physical layer, which may refer to downlink control information (DCI) or uplink control information (UCI).

FIG. 1 is a diagram illustrating a transmission structure in a time-frequency domain, that is, a radio resource region of a 5G or NR system according to an embodiment of the disclosure.

Referring to FIG. 1, a horizontal axis represents a time domain and a vertical axis represents a frequency domain in a radio resource region. A minimum transmission unit in the time domain is an OFDM symbol, and the $N_{symb}$ number of OFDM symbols 102 are gathered to constitute one slot 106. A length of a subframe may be defined as 1.0 ms and a radio frame 114 may be defined as 10 ms. A minimum transmission unit in a frequency domain is a subcarrier, and a bandwidth of the entire system transmission bandwidth may include a total of the NBW number of subcarriers 104. Such a specific value may be applied variably depending on the system.

A basic unit of a time-frequency resource region is a resource element (RE) 112, and may be represented by an OFDM symbol index and a subcarrier index. A resource block (RB) 108 or a physical RB (PRB) may be defined by the $N_{symb}$ number of consecutive OFDM symbols 102 in the time domain and the $N_{RB}^{RB}$ number of consecutive subcarriers 110 in the frequency domain. Therefore, one RB 108 may include the $N_{symb} \times N_{RB}$ number of REs 112.

In general, a minimum transmission unit of data is an RB unit. In a 5G or NR system, $N_{symb}=14$, $N_{RB}=12$, and NBW may be proportional to a bandwidth of a system transmission band. A data rate increases in proportion to the number of RBs scheduled to a terminal. In the 5G or NR system, a downlink transmission bandwidth and an uplink transmission bandwidth may be different in the case of a frequency division duplexing (FDD) system that operates by dividing a downlink and an uplink by frequency. A channel bandwidth represents a radio frequency (RF) bandwidth corresponding to a system transmission bandwidth. Table 1 below shows the correspondence between a channel bandwidth and the system transmission bandwidth defined in an LTE system that is fourth generation wireless communication, before the or NR system. For example, for an LTE system having a channel bandwidth of 10 MHz, a transmission bandwidth includes 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In the 5G or NR system, operations may be performed at a channel bandwidth wider than the channel bandwidth of LTE shown in Table 1. Table 2 shows the correspondence between a system transmission bandwidth, a channel bandwidth, and a subcarrier spacing (SCS) in the 5G or NR systems.

TABLE 2

| SCS | Channel bandwidth BW$_{channel}$ [MHz] | | | | | | | | | |
|---|---|---|---|---|---|---|---|---|---|---|
| [KHz] | 5 | 10 | 15 | 20 | 25 | 40 | 50 | 60 | 80 | 100 |
| Maximum  15 | 25 | 52 | 79 | 106 | 133 | 216 | 270 | N.A. | N.A. | N.A. |
| transmission  30 | 11 | 24 | 38 | 51 | 65 | 106 | 133 | 162 | 217 | 273 |
| bandwidth N$_{RB}$  60 | N.A. | 11 | 18 | 24 | 31 | 51 | 65 | 79 | 107 | 135 |

Scheduling information for downlink data or uplink data in the 5G or NR system is transferred from a base station to a terminal on the basis of DCI. DCI is defined according to various formats, and the DCI may represent, according to each format, whether scheduling information is for uplink data (e.g., UL grant) or scheduling information is for downlink data (e.g., DL grant), whether the DCI is compact DCI having a small size of control information, or whether the DCI is for power control. For example, DCI format 1_1, which is scheduling control information for downlink data (DL grant), may include at least one piece of following control information.

Carrier indicator: Indicating at which frequency carrier transmission is performed DCI format indicator: An indicator that identifies whether corresponding DCI is for downlink or uplink Bandwidth part (BWP) indicator: Indicating in which BWP downlink data is transmitted Frequency domain resource assignment: Indicating an RB of a frequency domain assigned for data transmission. A resource to be represented is determined according to the BWP and a resource assignment scheme.

Time domain resource assignment: Indicating in which OFDM symbol of which slot a data-related channel is to be transmitted VRB-to-PRB mapping: Indicating by which scheme a virtual RB (VRB) index and a physical RB (PRB) index are to be mapped Modulation and coding scheme (MCS): Indicating a coding rate and a modulation scheme used for data transmission. That is, a coding rate value that can inform of a transport block size (TBS) and channel coding information, in addition to information indicating whether a modulation scheme is quadrature phase shift keying (QPSK), quadrature amplitude modulation (QAM) such as 16-QAM, 64-QAM, or 256-QAM may be indicated.

Codeblock group (CBG) transmission information: When CBG retransmission is configured, indicating information relating to which CBG is transmitted HARQ process number: Indicating a process number of HARQ New data indicator: Indicating whether transmission is HARQ initial transmission or retransmission Redundancy version: Indicating a redundancy version of HARQ Transmission power control (TPC) command for physical uplink control channel (PUCCH): Indicating a transmission power control command for PUCCH, that is, an uplink control channel In the 5G or NR systems, physical uplink shared channel (PUSCH) mapping types are defined by type A and type B. In PUSCH mapping type A, a first symbol of demodulation reference signal (DMRS) symbols is located in a second or third symbol at a slot. In PUSCH mapping type B, a first symbol of DMRS symbols is located in a first symbol in a time domain resource assigned for PUSCH transmission.

The above-described method for PUSCH time domain resource assignment may be equally applicable to PDSCH time domain resource assignment.

DCI may be transmitted on a physical downlink control channel (PDCCH) which is a downlink physical control channel, via channel coding and modulation. Hereinafter, PDCCH transmission or reception may be mixed with DCI transmission or reception on the PDCCH, and such a technique may be applied to other channels.

In general, DCI is independently scrambled with a specific radio network temporary identifier (RNTI) (or a terminal identifier) for each terminal so as to have a cyclic redundancy check (CRC) added thereto, is channel-coded, and then is configured for each independent PDCCH to be transmitted. The PDCCH is mapped to a control resource set (CORESET) configured in the terminal and then transmitted.

Downlink data may be transmitted on a PDSCH, which is a physical channel for downlink data transmission. The PDSCH may be transmitted after a control channel transmission interval, and scheduling information, such as a specific mapping position, a modulation scheme, etc. in the frequency domain, is determined on the basis of DCI transmitted through the PDCCH.

Using MCS in control information of the DCI, a base station notifies a terminal of a modulation scheme applied to the PDSCH for transmission and the size of data to be transmitted in transport block (TB) size (TBS). In an embodiment, the MCS may include 5 bits or more, or fewer than 5 bits. The TBS corresponds to the size of data (i.e., TB) that the base station desires to transmit, before channel coding for error correction is applied to the data.

In the disclosure, a TB may include a MAC header, a MAC control element, one or more MAC service data units (SDUs), and padding bits. Alternatively, the TB may refer to a MAC protocol data unit (PDU) or a data unit for transformation from a MAC layer to a physical layer.

Modulation schemes supported by the 5G or NR system are QPSK, 16-QAM, 64-QAM, and 256-QAM, which correspond to modulation orders of 2, 4, 6, and 8, respectively. That is, 2 bits per symbol may be transmitted in the case of QPSK modulation, 4 bits per OFDM symbol may be transmitted in the case of 16-QAM modulation, 6 bits per symbol may be transmitted in the case of 64-QAM modulation, and 8 bits per symbol may be transmitted in the case of 256-QAM modulation.

In the case of PUSCH transmission, time domain resource assignment may be transferred according to information relating to a slot at which the PUSCH is transmitted, and a starting OFDM symbol position S at the slot and the number L of OFDM symbols to which the PUSCH is mapped. The above-described S may be a relative position from starting of the slot, L may be the number of consecutive OFDM symbols, and S and L may be determined on the basis of a start and length indicator value (SLIV) defined as follows.

```
If (L-1) ≤ 7 then
    SLIV = 14 · (L-1)+S
else
    SLIV = 14 · (14-L+1)+(14-1-S)
where 0 < L ≤ 14-S
```

In the 5G or NR system, a table including a SLIV value, a PUSCH mapping type, and information on a slot, at which a PUSCH is transmitted, in one row may be configured for a terminal generally via an RRC configuration. Subsequently, in time domain resource assignment of DCI, the base station may transfer information on a SLIV value, a PUSCH mapping type, and a slot, at which a PUSCH is transmitted, to the terminal by indicating an index value in the configured table.

Specifically, when a time resource assignment field index included in DCI for scheduling of the PDSCH indicates m, this indication informs of a combination of data resource assignment length L, a data resource start symbol S, a slot index $K_0$, PDSCH mapping type information, and DMRS type A position information (dmrs-TypeA-Position) corresponding to m+1 in the table indicating time domain resource assignment information. For example, Table 3 is a table that includes time domain resource assignment information.

TABLE 3

| Row index | dmrs-TypeA-position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position at which a DMRS is transmitted within one slot indicated by a system information block (SIB) that is a piece of terminal common control information. A possible value for the field is 2 or 3. When a total number of symbols constituting one slot is 14 and a first symbol index is 0, 2 refers to a third symbol and 3 refers to a fourth symbol. In Table 3, the PDSCH mapping type is information indicating a position of a DMRS in a scheduled data resource region. If the PDSCH mapping type is A, a DMRS is always transmitted or received at a symbol position determined by dmrs-typeA-Position regardless of the assigned data time domain resource. If the PDSCH mapping type is B, a position of the DMRS is always a first symbol of the assigned data time domain resource. In other words, PDSCH mapping type B does not use dmrs-typeA-Position information. In Table 3, $K_0$ refers to an offset of a slot index to which a PDCCH, on which DCI is transmitted, belongs and a slot index, to which a PUSCH or PDSCH scheduled in the DCI belongs. For example, if a slot index of the PDCCH is n, a slot index of the PUSCH or PDSCH scheduled by DCI of the PDCCH is n+$K_0$. In Table 3, S refers to a start symbol index of a data time domain resource within one slot. The range of a possible S value is 0 to 13 on the basis of a normal cyclic prefix. In Table 3, L refers to a data time domain resource interval length within one slot. The range of a possible L value is 1 to 14.

Figure 2:
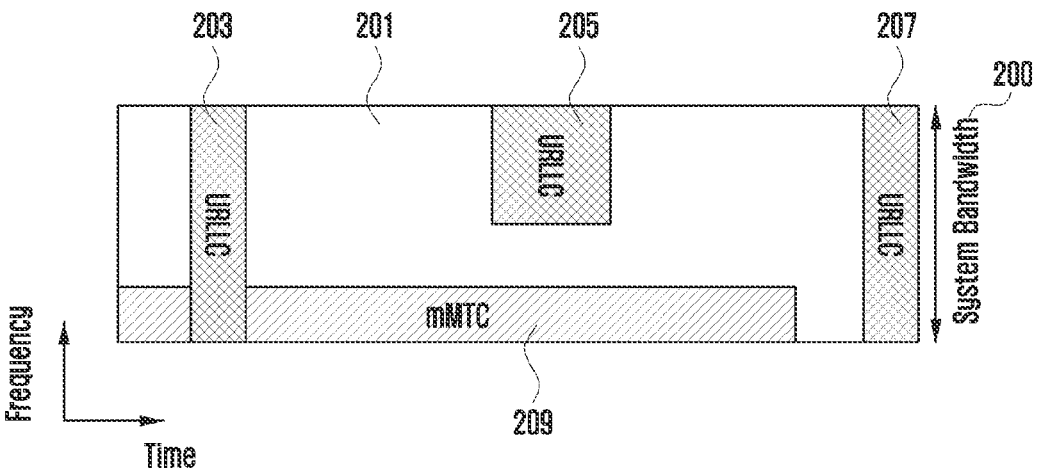
FIG. 2 is a diagram for explaining a method for assigning data for enhanced mobile broadband (eMBB), ultra-reliable and low-latency communications (URLLC), and massive machine type communications (mMTC) in a time-frequency resource region in a 5G or NR system according to an embodiment of the disclosure.

FIG. 2 is a diagram illustrating an example of assigning data for eMBB, URLLC, and mMTC in a time-frequency resource region in an 5G or NR system according to an embodiment of the disclosure.

Referring to FIG. 2, data for eMBB, URLLC, and mMTC may be assigned in the entire system frequency band 200. If URLLC data 203, 205, and 207 are generated and need to be transmitted while eMBB data 201 and mMTC data 209 are being assigned and transmitted in a specific frequency band, the URLLC data 203, 205, and 207 may be transmitted without transmitting or emptying parts where the eMBB 201 and the mMTC data 209 have already been assigned. Among the above-mentioned services, because the URLLC needs to reduce a latency time, URLLC data may be assigned and transmitted to a part of a resource to which the eMBB or the mMTC is assigned. If the URLLC is further assigned and transmitted in the resource to which the eMBB is assigned, eMBB data may not be transmitted in an overlapping time-frequency resource, and thus transmission performance of the eMBB data may be lowered. That is, an eMBB data transmission failure due to URLLC assignment may occur.

Figure 3:
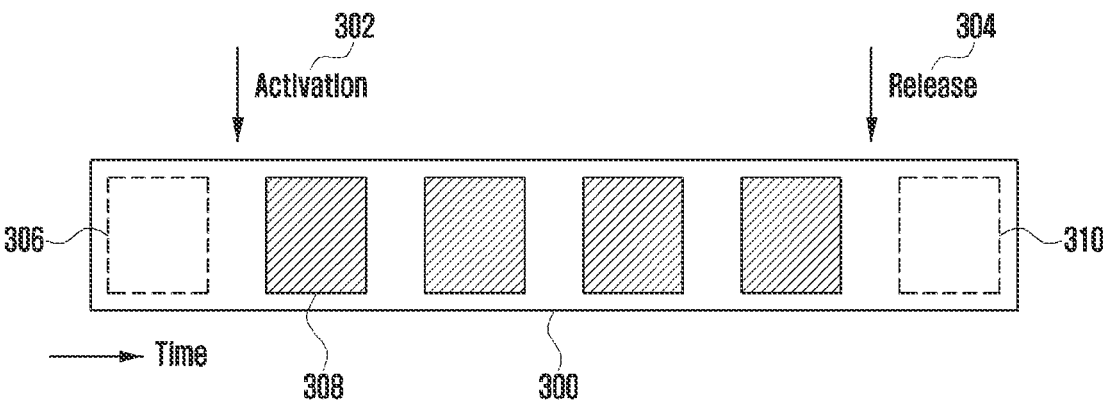
FIG. 3 is a diagram explaining a grant-free transmission/reception operation according to an embodiment of the disclosure.

FIG. 3 is a diagram explaining a grant-free transmission/reception operation according to an embodiment of the disclosure.

Referring to FIG. 3, a terminal should receive separate control information from a base station in order to transmit data to or receive data from the base station. However, in case of a service type requiring periodic traffic or low latency and/or high reliability, it may be possible to transmit or receive data without separate control information. Such a transmission scheme is referred to as a configured grant or grant-free based data transmission method. The transmission scheme includes a first signal transmission/reception type in which a terminal receives DCI from a base station and performs downlink data reception or uplink data transmission according to transmission configuration information indicated by the DCI, and a second signal transmission/reception type in which downlink data reception or uplink data transmission is performed according to information previously configured as a higher signal without DCI reception.

In the disclosure, semi-persistent scheduling (SPS), which is a second signal transmission/reception type for downlink data reception, refers to grant-free based PDSCH transmission in a downlink, and a UL grant type, which is a second signal transmission/reception type for uplink data transmission, refers to a grant-free based PUSCH transmission in an uplink. The UL grant type includes UL grant type 1 in which all grant-free based PUSCH-related configuration information is received only via a higher signal, and UL grant type 2 in which all grant-free based PUSCH-related configuration information is received via a higher signal and a DCI signal. Specifically, in the case of UL grant type 1, a terminal may perform grant-free based PUSCH transmission only with a higher signal configuration without DCI reception, whereas in the case of UL grant type 2, after receiving a higher signal configuration, a terminal may perform grant-free based PUSCH transmission via DCI reception. In the case of UL grant type 2, a part of configuration information is configured via a higher signal, and the other configuration information and whether to transmit actual data are determined by signal L1. Here, signal L1 may be broadly classified into a signal indicating activation of a resource, which is configured as an upper level, and a signal indicating release of the activated resource. For reference, similar to UL grant type 2, DL SPS is configured on the basis of a higher signal configuration and additional configuration information indicated by DCI, and the terminal may receive grant free based PDSCH transmission.

DL SPS is a method in which a base station and a terminal periodically transmit or receive downlink data on the basis of information configured by higher signaling without scheduling specific downlink control information to the terminal by the base station. This may be applied in voice over internet protocol (VOIP) or in a traffic situation that occurs periodically. Resource configuration for the DL SPS is periodic, but actually generated data may be aperiodic. In this case, because the terminal does not know whether actual data is generated at the periodically configured resources, it may be possible to perform the following three types of operations.

Method 1-1: With respect to a periodically configured DL SPS resource region, a terminal transmits HARQ-ACK information to a base station on an uplink resource region corresponding to the DL SPS resource region for a demodulation and/or a decoding result for received data.

Method 1-2: With respect to a periodically configured DL SPS resource region, if a signal for at least DMRS or data is successfully detected, a terminal transmits HARQ-ACK information to a base station on an uplink resource region corresponding to the DL SPS resource region for a demodulation and/or a decoding result for received data.

Method 1-3: With respect to a periodically configured DL SPS resource region, if demodulation and/or decoding is successfully performed (i.e., generation of ACK), a terminal transmits HARQ-ACK information to a base station on an uplink resource region corresponding to the DL SPS resource region for a demodulation and/or a decoding result for received data.

According to method 1-1, the terminal always transmits HARQ-ACK information in the uplink resource region corresponding to the DL SPS resource region even if the actual base station does not transmit downlink data for the DL SPS resource region. According to method 1-2, because it is unknown when the base station transmits data to the DL SPS resource region, the terminal may be able to transmit HARQ-ACK information when the terminal knows whether data is transmitted or received, such as successful DMRS detection or successful CRC detection. According to method 1-3, the terminal transmits HARQ-ACK information in the uplink resource region corresponding to the DL SPS resource region only when the terminal successfully demodulates and/or decodes data.

Among the above-described methods, the terminal may always support a single method or may support two or more methods. It may be possible to select one of the methods according to standards or higher signals. For example, if it is indicated, via a higher signal, to use method 1-1, the terminal may be able to transmit HARQ-ACK information for the DL SPS on the basis of method 1-1. Alternatively, it may also be possible to select one method according to DL SPS higher configuration information. For example, the terminal may be able to apply method 1-1 in the case where a transmission period is n slots or greater in the DL SPS higher configuration information, and the terminal may be able to apply method 1-3 in the opposite case. In this example, although a transmission period is taken as an example, it may be sufficiently possible to apply a specific method on the basis of an applied MCS table, DMRS configuration information, resource configuration information, and the like.

The terminal may perform downlink data reception in a downlink resource region configured via higher signaling. It may be possible to perform, via L1 signaling, activation or release of the downlink resource region configured via the higher signaling.

Referring to FIG. 3, operations for UL grant type 2 or DL SPS are illustrated. A terminal receives at least one grant-free based UL grant type 2 configuration information from a base station via a higher signal.

frequencyHopping: A field indicating whether hopping is intra-slot hopping or inter-slot hopping. If this field is not present, frequency hopping is deactivated.

cg-DMRS-Configuration: DMRS configuration information mcs-Table: A field indicating whether a 256-QAM MCS table or a new 64Q-AM MCS table is used when PUSCH transmission to which transform precoding is not applied is performed. If this field is not present, a 64-QAM MCS table is used.

mcs-TableTransformPrecoder: A field indicating an MCS table used by a terminal when transform precoding-based PUSCH transmission is performed. If this field is not present, a 64-QAM MCS table is used.

uci-OnPUSCH: Apply beta-offset to one of a dynamic scheme or a semi-static scheme.

resourceAllocation: Configure whether a resource assignment type is 1 or 2.

rbg-Size: Determine one of two configurable RB group (RBG) sizes.

powerControlLoopToUse: Determine whether to apply a closed loop power control.

p0-PUSCH-Alpha: Apply Po, a PUSCH alpha value, that is, a PUSCH power control parameter transformPrecoder: Configure whether to apply transform precoding. If this field is not present, follow msg3 configuration information.

nrofHARQ-Processes: The number of configured HARQ processes repK: the number of times of repetitive transmission repK-RV: A redundancy version (RV) pattern applied to each repetitive transmission when repetitive transmissions are performed. If the number of times of repetitive transmission is 1, this field is deactivated.

periodicity: A transmission period. From the minimum of 2 symbols to the maximum of 640 to 5120 slots based on subcarrier intervals are present.

The terminal determines UL grant type 2 configuration information by further considering at least one information that may be included in DCI which activates UL grant type 2, in addition to the UL grant type 2 higher configuration information.

timeDomainAllocation: A field indicating a transmission time resource region of PUSCH. A $K_2$ value indicates information of a slot offset at which UL grant type 2 transmission starts, on the basis of a slot in which the DCI has been transmitted.

frequencyDomainAllocation: A field indicating a transmission frequency resource regions of PUSCH antennaPort: Antenna port configuration information applied to grant-free PUSCH transmission dmrs-SeqInitialization: A field configured when a transform precoder is deactivated precodingAndNumberOfLayers: A field indicating a precoder applied to PUSCH transmission and the number of layers srs-ResourceIndicator: A field indicating a sounding reference signal (SRS) resource configuration information mcsAndTBS: MCS and TBS applied to PUSCH transmission frequencyHoppingOffset: A frequency hopping offset value SRS resource indicator: A field that controls power via an alpha value, P0 associated with SRS resources The configuration information is indicated on the basis of DCI in UL grant type 2, but in the case of UL grant type 1 supporting a grant-free PUSCH without DCI activation, the information and timeDomainOffset information are configured via a higher signal.

The terminal configures the next DL SPS configuration information from the higher signal.

Periodicity: A DL SPS transmission period nrofHARQ-Processes: The number of HARQ processes configured for DL SPS n1PUCCH-AN: A base station configures a resource in PUCCH format 0 or 1 on the basis of PUCCH HARQ resource configuration information for DL SPS mcs-Table: MCS table configuration information applied to DL SPS In the disclosure, all of DL SPS and UL grant type configuration information may be configured for each primary cell (Pcell) or secondary cell (Scell), and may also be configured for each bandwidth section (i.e., BWP). Further, it may be possible to configure one or more DL SPSs or UL grant types for each BWP specific to a particular cell.

Referring to FIG. 3, the terminal determines grant-free transmission/reception configuration information 300 via higher signal reception for a UL grant type or DL SPS. According to UL grant type 1, the terminal performs downlink data reception or uplink data transmission to a corresponding resource without separate DCI-based activation/release. According to DL SPS or UL grant type 2, the terminal may be able to transmit data to or receive data from a resource region 308 configured after receiving DCI indicating activation 302, and is not able to transmit data to or receive data from a resource region 306 configured before reception of the DCI. Further, the terminal is not able to transmit data to or receive data from a resource region 310 configured after receiving DCI indicating release 304.

If both of the following two conditions are satisfied for activation or release of UL grant type 2 scheduling or SPS, the terminal verifies DL SPS assignment PUCCH or configured UL grant type 2 PDCCH.

Condition 1: A case where a CRC bit of a DCI format transmitted on PDCCH is scrambled with a configured scheduling RNTI (CS-RNTI) configured via higher signaling Condition 2: A case where a new data indicator (NDI) field for an activated transmission block is configured to be 0

If a part of fields constituting a DCI format transmitted on the DL SPS assignment PDCCH or configured UL grant type 2 is the same as that presented in Table 4 or Table 5, the terminal determines that information in the DCI format is valid activation or valid release of DL SPS or UL grant type 2. For example, when the DCI format including information presented in Table 4 is detected, the terminal determines that DL SPS or UL grant type 2 has been activated. As another example, when the DCI format including information presented in Table 5 is detected, the terminal determines that DL SPS or UL grant type 2 has been released.

If a part of fields constituting a DCI format transmitted on the DL SPS assignment PDCCH or configured UL grant type 2 is not the same as that presented in Table 4 or Table 5, the terminal determines that the DCI format is detected via a CRC that does not match.

TABLE 4

|  | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 5

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

If the terminal receives PDSCH without receiving PDCCH or receives PDCCH indicating release of SPS PDSCH, the terminal generates a HARQ-ACK information bit corresponding thereto. The terminal does not expect to transmit HARQ-ACK information for reception of two or more SPS PDSCHs in one PUCCH resource. In other words, the terminal includes only HARQ-ACK information for reception of one SPS PDSCH in one PUCCH resource.

Tables 4 to 5 described above may be fields available in a situation where only one DL SPS or UL grant type 2 can be configured for each cell or BWP. In a situation where a plurality of DL SPSs or UL grant type 2 is configured for each cell or bandwidth part, a DCI field for activating (or releasing) each DL SPS resource or UL grant type 2 resource may be different. The disclosure provides a method for solving such a situation.

Not all DCI formats described in Tables 4 and 5 in the disclosure are used to activate or release DL SPS or UL grant type 2 resources, respectively. For example, DCI format 0_0 and DCI format 0_1 used for scheduling PUSCH are utilized for activating UL grant type 2 resources, and DCI format 1_0 and DCI format 1_1 used for scheduling PDSCH are utilized for activating DL SPS resources. DCI format 0_0 used for scheduling PUSCH is utilized for releasing UL grant type 2 resources, and DCI format 1_0 used for scheduling PDSCH is utilized for releasing DL SPS resources.

Figure 4:
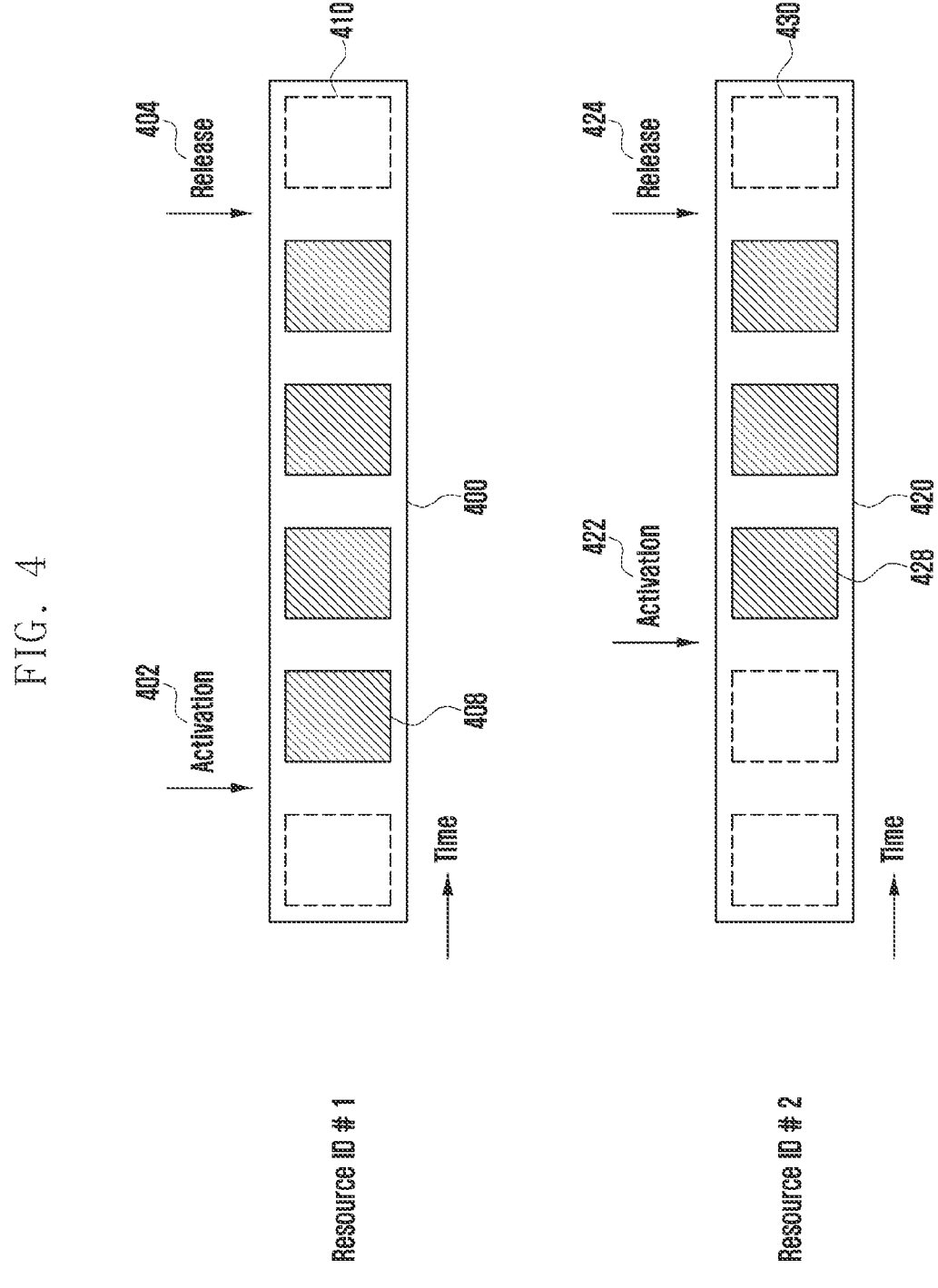
FIG. 4 is a diagram illustrating a downlink control information (DCI) activation/release method in a situation where a plurality of grant-free resources (downlink (DL) semi-persistent scheduling (SPS) or uplink (UL) grant type 2) are configured according to an embodiment of the disclosure.

FIG. 4 is a diagram illustrating a DCI activation/release method in a situation where a plurality of grant-free resources (DL SPS or UL grant type 2) are configured according to an embodiment of the disclosure.

Referring to FIG. 4, an example is illustrated in which a base station configures two DL SPS resources (or UL grant type 2 resources) for each BWP and one cell via a higher signal. When a first DL SPS resource (or UL grant type 2 resource) is referred to as resource identifier (ID) #1 400 and a second DL SPS resource (or UL grant type 2 resource) is referred to as resource ID #2 420, it may be possible to use a specific DCI field to activate or release each of the resources. In particular, it may be possible to activate or release each DL SPS resource (or UL grant type 2 resource) by using a HARQ process number.

For example, it may be possible that resource ID #1 400, which is the first DL SPS resource (or UL grant type 2 resource), is activated or released by DCI in which the HARQ process number indicates 1. In more detail, if fields constituting a DCI format transmitted on a DL SPS assignment PDCCH (or a configured UL grant type 2 PDCCH) with respect to a specific DL SPS resource (or UL grant type 2 resource) ID are the same as those in Table 6 below, the terminal activates a DL SPS (or UL grant type 2) resource corresponding to the ID, and when the fields are the same as those in Table 7, the terminal releases the DL SPS (or UL grant type 2) resource corresponding to the ID.

TABLE 6

| | DCI format 0_0/0_1 | DCI format 1_0 | DCI format 1_1 |
|---|---|---|---|
| HARQ process number | Indicate "x" | Indicate "x" | Indicate "x" |
| Redundancy version | set to '00' | set to '00' | For the enabled transport block: set to '00' |

TABLE 7

| | DCI format 0_0 | DCI format 1_0 |
|---|---|---|
| HARQ process number | Indicate "x" | Indicate "x" |
| Redundancy version | set to '00' | set to '00' |
| Modulation and coding scheme | set to all '1's | set to all '1's |
| Resource block assignment | set to all '1's | set to all '1's |

For example, the DL SPS ID or the UL grant type 2 ID may be configured based on higher signal configuration information. When the ID is 5, activation or release may be performed by DCI indicating a HARQ process number of 5. As another example, it may be possible that the DL SPS ID or the UL grant type 2 ID is directly configured using a HARQ process number. For example, if a HARQ process number of 5 is included in higher configuration information of a specific DL SPS or UL grant type 2, activation or release may be performed by the HARQ process number of 5 (including DCI). As another example, if HARQ process numbers of 5 and 10 are included in the higher configuration information of a specific DL SPS or UL grant type 2, activation or release may be performed by the HARQ process numbers of 5 and 10 (included in DCI).

Referring to FIG. 4, a diagram illustrates an example of operations of individually activating or releasing a DL SPS resource (or UL grant type 2 resource). With respect to the DL SPS (or UL grant type 2) resource 400 having an ID of 1 as a higher signal, the terminal may activate the DL SPS resource on the basis of reception of DCI 402 which has a HARQ process number of 1 and includes information as shown in Table 6, and the terminal may transmit or receive grant-free based data on a resource 408 configured after reception of the DCI indicating activation. With respect to the DL SPS (or UL grant type 2) resource 400 having the ID of 1 as a higher signal, the terminal may release the DL SPS resource on the basis of reception of DCI 404 which has the HARQ process number of 1 and includes information as shown in Table 7. The terminal is unable to transmit or receive grant-free based data on a resource 410 configured after reception of the DCI indicating release.

With respect to the DL SPS (or UL grant type 2) resource 420 having an ID of 2 as a higher signal, the terminal may activate the DL SPS resource on the basis of reception of DCI 422 which has a HARQ process number of 2 and includes information as shown in Table 6, and the terminal may transmit or receive grant-free based data on a resource 428 configured after reception of the DCI indicating activation. With respect to the DL SPS (or UL grant type 2) resource 420 having the ID of 1 as a higher signal, the terminal may release the DL SPS resource on the basis of reception of DCI 424 which has the HARQ process number of 2 and includes information as shown in Table 7. The terminal is unable to transmit or receive grant-free based data on a resource 430 configured after reception of the DCI indicating release. That is, the terminal requires individual DCI for activating or releasing a resource region for individual grant-free based data transmission/reception.

Although the above example has described activation or release of individual DL SPS (or UL grant type 2) via HARQ process numbers, it may also be possible to use DCI field(s) other than HARQ process numbers. Examples thereof may include an RV value, frequency assignment information, time assignment information, an NDI value, and a transmission type, such as broadcast/multicast/unicast, etc.

Figure 5:
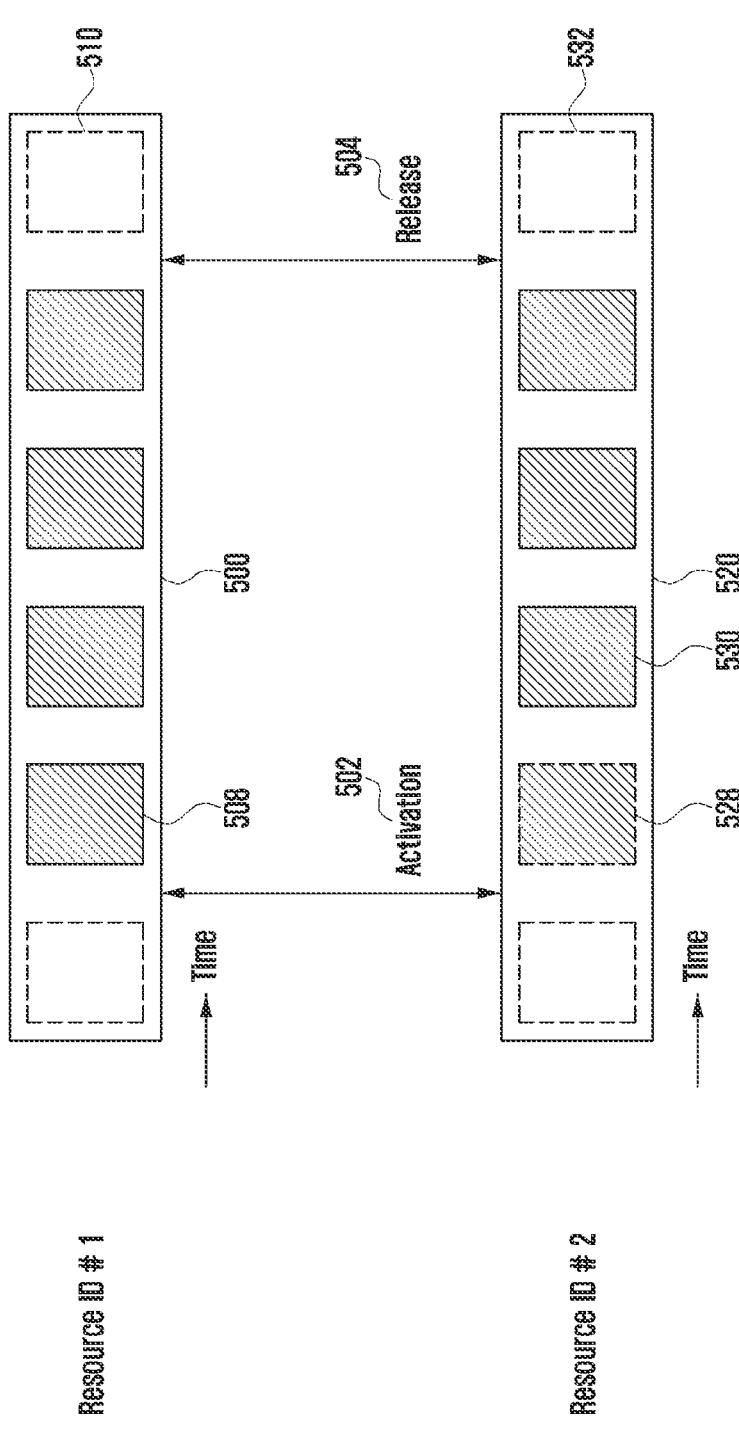
FIG. 5 is a diagram illustrating a DCI activation/release method in a situation where a plurality of grant-free resources (DL SPS or UL grant type 2) are configured according to an embodiment of the disclosure.

FIG. 5 is a diagram illustrating a DCI activation/release method in a situation where a plurality of grant-free resources (DL SPS or UL grant type 2) are configured according to an embodiment of the disclosure.

Referring to FIG. 5, an example terminal is illustrated that concurrently activates or releases one or more DL SPS (or UL grant type 2) resources. Similar to FIG. 4, it may be possible that a terminal is configured and operate two or more DL SPS (or UL grant type 2) resources for each cell and for each BWP. FIG. 4 illustrates an example of using HARQ process numbers in a DCI field to activate or release respective DL SPS (or UL grant type 2) resources. However, in an example of FIG. 5, it may be possible that the terminal concurrently activates or releases one or more DL SPS (or UL grant type 2) resources on the basis of one piece of DCI information. For example, in a situation where there are a DL SPS (or UL grant type 2) resource 500 having an ID of 1 and a DL SPS (or UL grant type 2) resource 520 having an ID of 2, if the terminal receives DCI 502 for activating the DL SPS (or UL grant type 2) as shown in Table 4, the terminal activates all of DL SPS (or UL grant type 2) resource configurations previously configured via a higher signal on the basis of corresponding DCI. The terminal may transmit or receive grant-free based data on DL SPS (or UL grant type 2) resources 508 and 528 configured after receiving the DCI 502 indicating activation. Further, the terminal is unable to transmit or receive grant-free based data on DL SPS (or UL grant type 2) resources 510 and 532 configured after receiving the DCI 504 indicating release.

In order to activate two or more DL SPS (or UL grant type 2) resources on the basis of one piece of DCI, a part of the following information should be transferred via a higher signal in addition to information known via the higher signal as in the conventional manner. This is because two or more DL SPSs (or UL grant type 2) have common time and frequency assignment information, antenna ports, and DMRS sequence information, if the following information is configured via DCI.

timeDomainAllocation: A field indicating a transmission time resource region of PUSCH. A $K_2$ value indicates information of a slot offset at which UL grant type 2 transmission starts, on the basis of a slot in which the DCI has been transmitted.

frequencyDomainAllocation: A field indicating a transmission frequency resource regions of PUSCH antennaPort: Antenna port configuration information applied to grant-free PUSCH transmission dmrs-SeqInitialization: A field configured when a transform precoder is deactivated precodingAndNumberOfLayers: A field indicating a precoder applied to PUSCH and the number of layers srs-ResourceIndicator: A field indicating SRS resource configuration information mcsAndTBS: MCS and TBS applied to PUSCH frequencyHoppingOffset: A frequency hopping offset value pathlossReferenceIndex: A field indicating a reference signal that is a reference for a path loss timedomainoffset If information described above is configured as a higher signal for DL SPS (or UL grant type 2), the terminal may be able to concurrently activate or release two or more DL SPS (or UL grant type 2) resources by DCI indicating activation or release. Each of the DL SPS (or UL grant type 2) resources may be able to have different information by configuration of each higher signal.

For reference, timedomainoffset information is used for UL grant type 1 that may transmit or receive grant-free base data without receiving DCI, and a value of corresponding timedomainoffset means a system frame number (SFN). Such information may be used as it is, or may be reinterpreted as resource offset information enabling transmission or reception of grant-free based data after a slot number reference at which DCI indicating activation instead of an SFN is received. Alternatively, it may be possible to inform offset information by $K_0$ or $K_2$ present in timedomainresourceallocation instead of the timedomainoffset information. Here, $K_0$ refers to an offset value between a slot at which DCI including activation information is transmitted and a slot at which grant-free based PDSCH transmission (DL SPS) may be started. Here, $K_2$ refers to an offset value between a slot at which DCI including activation information is transmitted and a slot at which grant-free based PUSCH transmission (UL grant type 2) may be started.

In the case of using such information, in FIG. 5, after receiving an activation signal 502 in DL SPS (or UL grant type 2) resource configuration information with an ID of 2, the terminal may transmit or receive grant-free based data from 528 or 530 according to the offset information. In the disclosure, the offset unit is described as a slot, but may be a symbol unit or a sub slot (or symbol group) unit in addition to the slot unit. The unit may be previously defined in the standard or may be separately configured on the basis of a higher signal.

In a situation where a plurality of DL SPS (or UL grant type 2) resources may be configured for the terminal for each BWP and each cell, FIG. 4 mainly describes an example of activating or releasing one DL SPS (or UL grant type 2) resource corresponding to each DCI, and FIG. 5 describes an example of activating or releasing a plurality of DL SPSs (or UL grant type 2) resources via one piece of DCI. For the convenience of description, FIG. 4 is referred to as an individual configuration method, and FIG. 5 is referred to as a concurrent configuration method.

The terminal may be able to support all the operations described in FIG. 4 and FIG. 5, and the following methods may be available.

Method 2-1: Configuration Based on a Higher Signal

When a DL SPS (or UL grant type 2) resource is configured based on a higher signal, indicating whether the resource is activated (or released) by the individual configuration method or by the concurrent configuration method. As another method, when a higher signal for configuration of a DL SPS (or UL grant type 2) resource is received, if specific information is true or a value thereof exists, the terminal considers that the DL SPS resource is a concurrent configuration method resource, but if the specific information is false and a value thereof does not exist, the terminal considers that the DL SPS resource is an individual configuration method resource. An example of the above-described information may correspond to timeDomainAllocation, FrequencyDomainAllocation, AntennaPort, dmrs-SeqInitialization, precodingAndNumberOfLayers, srs-ResourceIndicator, mcsAndTBS, frequencyHoppingOffset, pathlossReferenceIndex, and timedomainoffset.

Method 2-2: Configuration Based on Signal L1

When a plurality of DL SPS (or UL grant type 2) resources are configured based on a higher signal, indicating whether the resources are activated (or released) by the individual configuration method or by the concurrent configuration method, on the basis of signal L1. For example, it may be possible that the methods are applied via a HARQ process field as shown in Table 8.

TABLE 8

| HARQ process number (bitmap) | DL SPS (UL grant type 2) resource number |
|---|---|
| 0 (0000) | 0 |
| 1 (0001) | 1 |
| 2 (0010) | 2 |
| . . . | . . . |
| 15 (1111) | All |

Referring to Table 8 as an example, if the terminal receives DCI format 1_0 or DCI format 1_1 for activating DL SPS, and a HARQ process number in corresponding DCI indicates 0, the terminal may determine that a DL SPS resource with an ID of 0 has been activated. Alternatively, if the terminal receives DCI format 0_0 or DCI format 0_1 for activating UL grant type 2, and a HARQ process number in corresponding DCI indicates 0, the terminal may determine that a UL grant type 2 resource with an ID of 0 has been activated. If the terminal receives DCI format 1_0 or DCI format 1_1 for releasing DL SPS, and a HARQ process number in corresponding DCI indicates 0, the terminal may determine that a DL SPS resource with an ID of 0 has been released. Alternatively, if the terminal receives DCI format 0_0 or DCI format 0_1 for releasing UL grant type 2, and a HARQ process number in corresponding DCI indicates 0, the terminal may determine that a UL grant type 2 resource with an ID of 0 has been released.

In another example, if the terminal receives DCI format 1_0 or DCI format 1_1 for activating DL SPS, and a HARQ process number in corresponding DCI indicates 15, the terminal determines that all DL SPS resources, which have been configured based on higher signals and deactivated up to the current time, are activated. If the terminal receives DCI format 0_0 or DCI format 0_1 for activating UL grant type 2, and a HARQ process number in corresponding DCI indicates 15, the terminal determines that all UL grant type 2 resources, which have been configured based on higher signals and deactivated up to the current time, are activated. If the terminal receives DCI format 1_0 or DCI format 1_1 for releasing DL SPS, and a HARQ process number in corresponding DCI indicates 15, the terminal determines that all DL SPS resources, which have been activated up to the current time, are released. If the terminal receives DCI format 0_0 or DCI format 0_1 for releasing UL grant type 2, and a HARQ process number in corresponding DCI indicates 15, the terminal determines that all UL grant type 2, which have been activated up to the current time, are released.

In this case, DCI format 0_0 or DCI format 0_1 which activates UL grant type 2 may be identical to Table 4 except for the HARQ process field. DCI format 1_0 or DCI format 1_1 which activates DL SPS may be identical to Table 4 except for the HARQ process field. DCI format 0_0 or DCI format 0_1 which releases UL grant type 2 may be identical to Table 5 except for the HARQ process field. DCI format 1_0 which releases DL SPS may be identical to Table 5 except for the HARQ process field.

As another example, it may be possible that Table 8 is used only for the purpose of releasing a DL SPS (or UL grant type 2) resource. In this case, Table 8 may be applicable only to DCI format 1_0 (or DCI format 0_0) indicating release of a DL SPS (or UL grant type 2) resource. In Table 8, it is assumed that one HARQ process number is mapped to one DL SPS (or UL grant type 2) resource ID, but it may be possible that one DL SPS (or UL grant type 2) resource ID is mapped to multiple HARQ process numbers. For example, when the DL SPS (or UL grant type 2) resource is configured based on a higher signal, the base station may configure one HARQ process number associated with a corresponding resource ID, or two or more HARQ process numbers associated with the same. Therefore, when the DL SPS (or UL grant type 2) is activated based on a specific HARQ process number, the terminal may be able to concurrently activate one or more DL SPSs (or UL grant type 2) associated with the corresponding number. Table 9 provides the description as an example.

For example, according to Table 9, if the terminal receives the DCI format 1_0 or DCI format 1_1 for activating DL SPS, and a HARQ process number in corresponding DCI indicates 0, the terminal may determine that DL SPS resources with IDs of 0 and 5 have been activated. Alternatively, if the terminal receives DCI format 0_0 or DCI format 0_1 for activating UL grant type 2, and a HARQ process number in corresponding DCI indicates 0, the terminal may determine that a UL grant type 2 resources with IDs of 0 and 5 have been activated. If the terminal receives DCI format 1_0 or DCI format 1_1 for releasing DL SPS, and a HARQ process number in corresponding DCI indicates 0, the terminal may determine that DL SPS resources with IDs of 0 and 5 have been released. Alternatively, if the terminal receives DCI format 0_0 or DCI format 0_1 for releasing UL grant type 2, and a HARQ process number in corresponding DCI indicates 0, the terminal may determine that UL grant type 2 resources with IDs of 0 and 5 have been released.

TABLE 9

| HARQ process number (bitmap) | DL SPS (UL grant type 2) resource number |
|---|---|
| 0 (0000) | 0, 5 |
| 1 (0001) | 1, 5, 10 |
| 2 (0010) | 2, 5, 12 |
| . . . | . . . |
| 15 (1111) | 0, 2, 3, 4, . . . , 14 |

As a method of identifying a DL SPS (UL Grant Type 2) resource based on signal L1 described above, a HARQ process number is described as an example. However, it may be possible to identify each resource by other DCI fields (RV, MCS, etc.) in addition to the HARQ process number. If grant-free based data transmission/reception resource individually configured for broadcast/multicast/unicast is configured, when a DL SPS (or UL grant type 2) resource (which is not a grant-free based resource information ID) is configured based on a higher signal, information associated with a HARQ process number may correspond to a field indicating whether corresponding resource information is broadcast, multicast, or unicast. Therefore, instead of the resource numbers described in column 2 in Tables 8 and 9, it may also be possible to denote using a term of a transmission method for broadcast, multicast, or unicast. In other words, when it is possible that a corresponding grant-free resource is configured to be associated with at least one of broadcast, multicast, and unicast, the HARQ process number may indicate whether to activate or release a specific grant-free resource by indicating at least one of transmission schemes (broadcast, multicast, and unicast). Table 10 includes an example relating thereto. In Table 10, the transmission scheme (broadcast, unicast, and multicast) may be used by replacement with other information, such as packet priority information or HARQ-ACK feedback support.

TABLE 10

| HARQ process number (bitmap) | DL SPS (UL grant type 2) resource |
|---|---|
| 0 (0000) | Broadcast |
| 1 (0001) | Unicast |
| 2 (0010) | Broadcast, Unicast |
| . . . | . . . |
| 15 (1111) | Broadcast, Unicast, Multicast |

Figure 6:
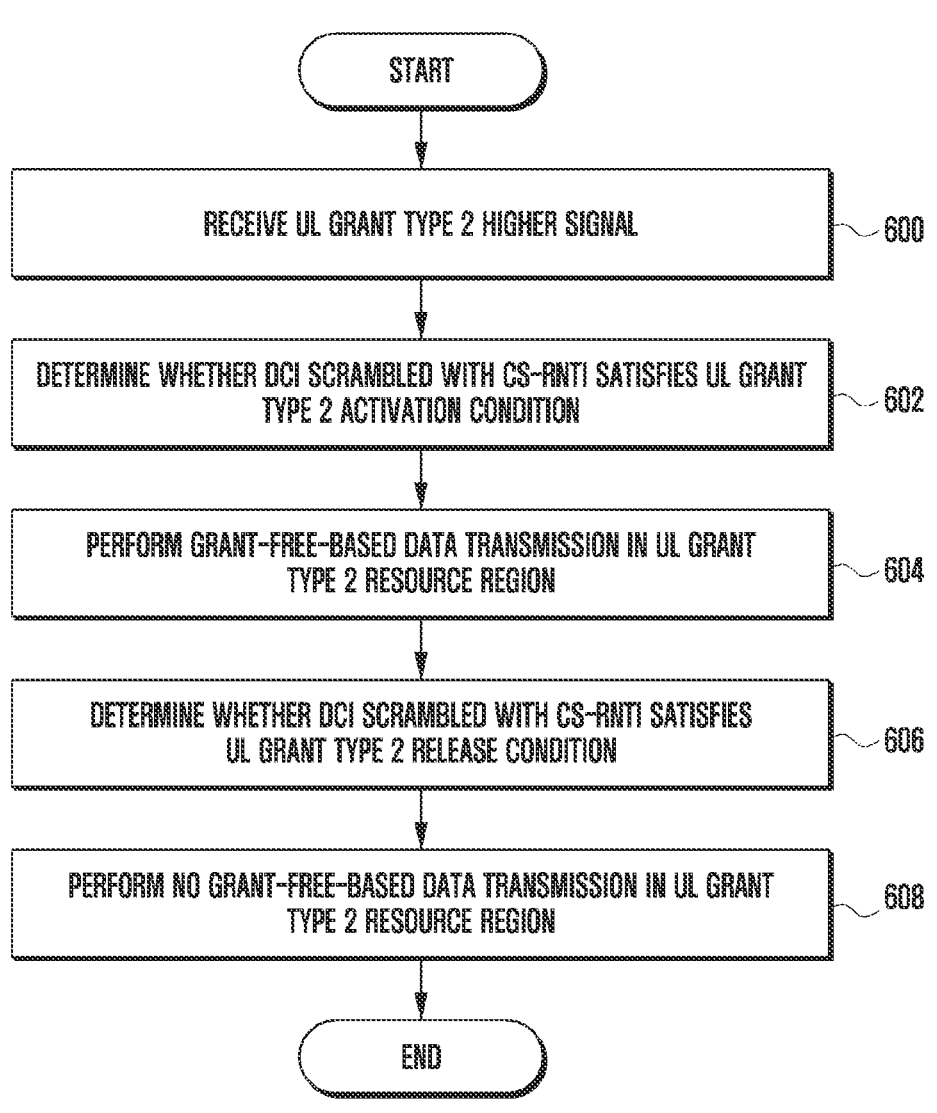
FIG. 6 is a block diagram illustrating a UL grant type 2-based uplink data transmission operation of a terminal according to an embodiment of the disclosure.

FIG. 6 is a block diagram illustrating a UL grant type 2-based uplink data transmission operation of a terminal according to an embodiment of the disclosure.

Referring to FIG. 6, a terminal receives 600, from a base station, a higher layer signaling for UL grant type 2-based PUSCH transmission. It may be possible that two or more grant-free resources are configured for the terminal for each BWP and each cell. The terminal detects DCI including a CRC scrambled with CS-RNTI, and determines whether a specific field among corresponding DCI fields satisfies an activation 602 or release 606 condition of UL grant type 2. An example of the field may correspond to the RV, the MCS, the frequency resource assignment field, etc., which are described in Tables 4 to 5. If the field of DCI indicates a specific value, and the value satisfies the activation or release condition of UL grant type 2, the terminal determines that verification has passed. By means of DCI for which verification has been completed, the terminal may activate or release a plurality of UL grant type 2 resources configured based on the upper signal via the following methods.

Method 3-1: Individual Activation or Individual Release

The terminal determines that only a specific UL grant type 2 resource is released, wherein the specific UL grant type 2 resource is indicated by all bits or 3 least significant bits (LSBs) of a HARQ process number field in the DCI, for which activation or release verification of UL grant type 2 has passed.

Method 3-2: Individual Activation or Group Release

The terminal determines that only a specific UL grant type 2 resource is activated, wherein the specific UL grant type 2 resource is indicated by all bits or 3 LSBs of a HARQ process number field in the DCI, for which activation verification of UL grant type 2 has passed. The terminal determines that all the currently activated UL grant type 2 resources are released, on the basis of the DCI for which release verification of UL grant type 2 has passed.

Method 3-3: Group Activation or Individual Release

The terminal determines that all the currently deactivated UL grant type 2 resources are activated, on the basis of the DCI for which activation verification of UL grant type 2 has passed. The terminal determines that only a specific UL grant type 2 resource is released, wherein the specific UL grant type 2 resource is indicated by all bits or 3 LSBs of a HARQ process number field in the DCI, for which release verification of UL grant type 2 has passed.

Method 3-4: Group Activation or Group Release

The terminal determines that all currently deactivated UL grant type 2 resources are activated, on the basis of the DCI for which activation verification of UL grant type 2 has passed. The terminal determines that all the currently activated UL grant type 2 resources are released, on the basis of the DCI for which release verification of UL grant type 2 has passed.

Method 3-5: Combination of the Methods

The terminal determines that only a specific UL grant type 2 resource is activated or released, wherein the specific UL grant type 2 resource is indicated by all bits or 3 LSBs of a HARQ process number field in the DCI, for which activation or release verification of UL grant type 2 has passed. In case of a specific bit value (for example, if a 4-bit HARQ process number is 1111) of HARQ process number fields, the terminal may determine that all the currently deactivated UL grant type 2 resources are activated based on the DCI for which activation verification of UL grant type 2 has passed, or the terminal may determine that all the currently activated UL grant type 2 resources are released based on the DCI for which release verification of UL grant type 2 has passed.

If the terminal succeeds in detecting DCI including the CRC scrambled with CS-RNTI, by means of one of the methods, and the DCI indicates activation for at least one grant-free based resource configured based on an upper signal, the terminal may transmit grant-free based data via a corresponding resource region 604. If the terminal succeeds in detecting DCI including the CRC scrambled with CS-RNTI, by means of one of the methods, and the DCI is configured based on an upper signal and indicates release for at least one grant-free based resource region which has already been activated, it is expected 608 that the terminal may no longer transmit grant-free based data via the corresponding resource region.

Although the terminal has received DCI information including the CRC scrambled with CS-RNTI, if it has failed to satisfy a grant-free based data transmission resource activation or release condition (or verification has failed), the terminal considers that received DCI format information has been received by a non-matching CRC.

Referring to FIG. 6, the case of UL grant type 2 has been described, but the same description may be sufficiently applicable to DL SPS.

Figure 7:
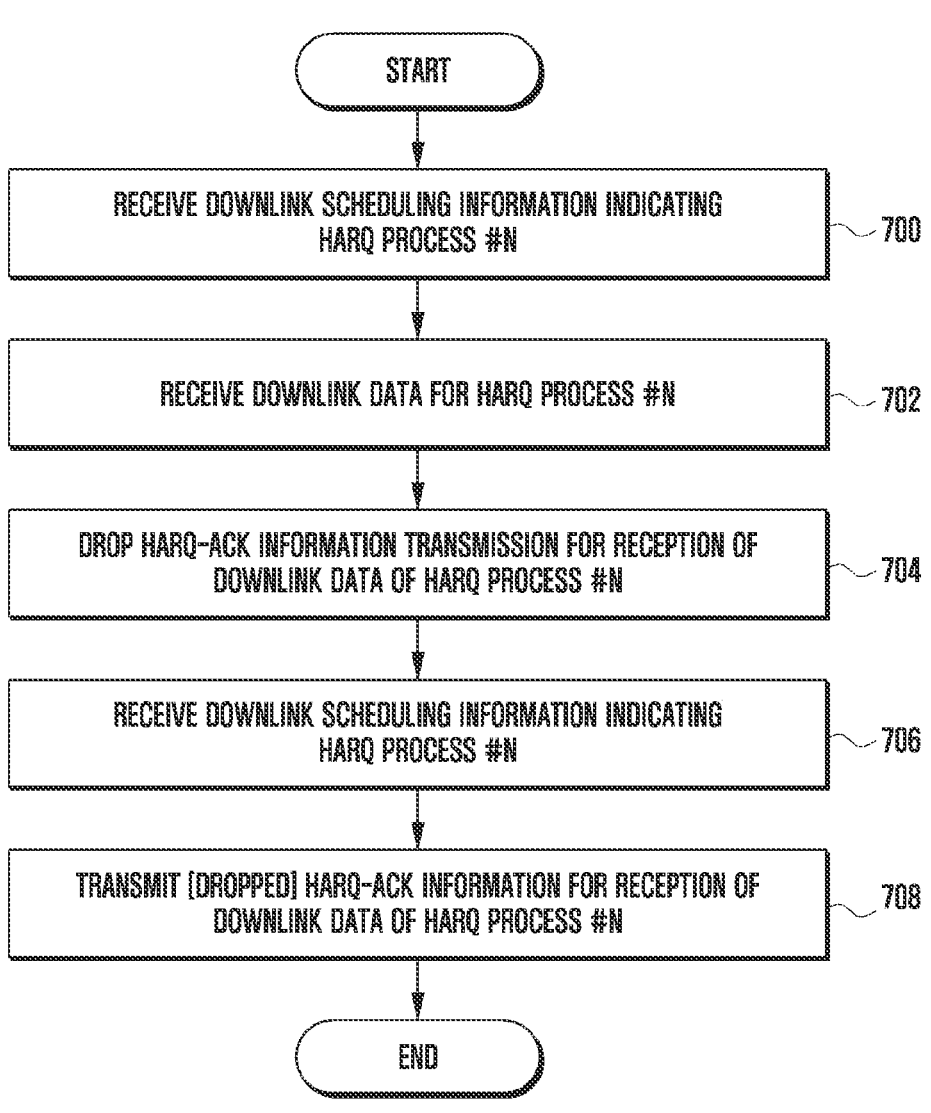
FIG. 7 is a block diagram illustrating an operation procedure of a terminal according to an embodiment of the disclosure.

FIG. 7 is a block diagram illustrating an operation procedure of a terminal according to an embodiment of the disclosure.

Referring to FIG. 7, a terminal receives DCI from a base station, and considers a first signal transmission/reception type for performing downlink data reception or uplink data transmission according to transmission configuration information indicated by the DCI. Specifically, the terminal even considers a procedure of receiving first DCI indicating data scheduling in the base station, receiving downlink data, and then transmitting HARQ-ACK information relating thereto to the base station. The HARQ-ACK information includes information indicating whether the terminal successfully demodulates and/or decodes downlink data. For example, 1 is mapped to HARQ-ACK information and transmitted to the base station, if demodulation and/or decoding of the downlink data succeed, and otherwise 0 is mapped to HARQ-ACK information and transmitted to the base station. The base station may determine whether to retransmit the downlink data, on the basis of HARQ-ACK information reception, and the base station and the terminal may perform more reliable wireless data communication via the HARQ-ACK procedure. In the 5G or NR system, the HARQ-ACK information transmission may be canceled for the following reasons.

1. A case where the HARQ-ACK resource is changed to a downlink resource by second DCI
2. A case where transmission is dropped by other UCI having higher priority than the HARQ-ACK resource
3. A case where the HARQ-ACK resource at least partially overlaps in time or frequency with an uplink transmission resource indicated by second DCI, and the priority of the HARQ-ACK resource is lower than the priority of UCI transmitted via the overlapped uplink transmission resource
4. A case where the base station indicates the terminal to cancel the transmission on the HARQ-ACK resource on the basis of the second DCI
5. A case where the base station schedules downlink data resource having the same HARQ process number before the HARQ-ACK resource transmission, on the basis of the second DCI The above examples are merely examples, and in other various cases, it may be possible for the terminal to drop the HARQ-ACK transmission indicated by the first DCI. The above-described examples consider a situation in which the terminal receives the second DCI from the base station before transmitting the HARQ-ACK information via the HARQ-ACK transmission resource configured based on the first DCI. In general, a situation, in which the first DCI is first transmitted from a base station to a terminal and then the second DCI is transmitted, may occur, and a case where the terminal cancels the HARQ-ACK information transmission on the basis of the DCI received after transmission of the HARQ-ACK information may not occur. Because the terminal requires a time for blind decoding the second DCI, the base station should transmit the second DCI in consideration of a processing time required for decoding and determining the second DCI by the terminal before the HARQ-ACK information transmission. Otherwise, the terminal may not expect a HARQ-ACK transmission drop scheduled based on the first DCI.

Referring to FIG. 7, a block diagram of a terminal procedure relating thereto is illustrated. For example, the terminal receives first DCI 700 including HARQ process number n, and receives downlink data 702 corresponding to HARQ process number n according to configuration information of the first DCI. The terminal generates HARQ-ACK information 704 for a downlink data demodulation and/or decoding result, and cancels or drops, before performing transmission, actual HARQ-ACK information transmission due to at least one of the above described reasons. In this situation, because the base station has failed to receive, from the terminal, HARQ-ACK feedback including whether downlink data transmission associated with HARQ processing number n is successfully performed, it should receive the feedback via a separate indicator. If, as in a conventional method, the base station determines that a result of the HARQ-ACK reception is a NACK and schedules retransmission, waste of downlink data resource may occur. Because a probability that NACK occurs in HARQ-ACK in a normal LTE or NR system is less than 10%, unconditionally determining that a HARQ-ACK information drop situation indicated by the first DCI is NACK may be a waste in terms of using system radio resources. Therefore, at least one of the following methods may be considered.

Method 4-1: Scheduling Based on DCI Including Same HARQ Process Number n

After HARQ-ACK information transmission scheduled based on first DCI is dropped, if third DCI information 706 transmitted from the base station includes n, i.e., the same HARQ process number as that of the first DCI, the terminal determines that the third DCI information is for retransmission of the previously dropped HARQ-ACK information. Therefore, the terminal may determine that only a HARQ-ACK information resource is valid among fields constituting the third DCI information, and may determine that other fields related to downlink or uplink data scheduling are not valid.

Method 4-2: Including the Same HARQ Process Number n, and Scheduling DCI in which a Specific DCI Field is Fixed to a Specific Value After HARQ-ACK information transmission scheduled based on first DCI is dropped, if third DCI information 706 transmitted from the base station includes n, i.e., the same HARQ process number as that of the first DCI, and a value of a specific DCI field indicates a specific value, the terminal determines that the third DCI information is for retransmission of the previously dropped HARQ-ACK information. In an example in which the value of the specific DCI field is a specific value, all frequency resource assignment field bitmaps may indicate 0 or 1. Alternatively, a case where MCS information indicates a specific value may also be another example. Therefore, the terminal may determine that only a HARQ-ACK information resource is valid among fields constituting the third DCI information, and may determine that other fields related to downlink or uplink data scheduling are not valid.

The terminal transmits HARQ-ACK information 708 relating to downlink data associated with HARQ process n dropped on the HARQ-ACK resource region indicated by at least one of the above methods.

Figure 8:
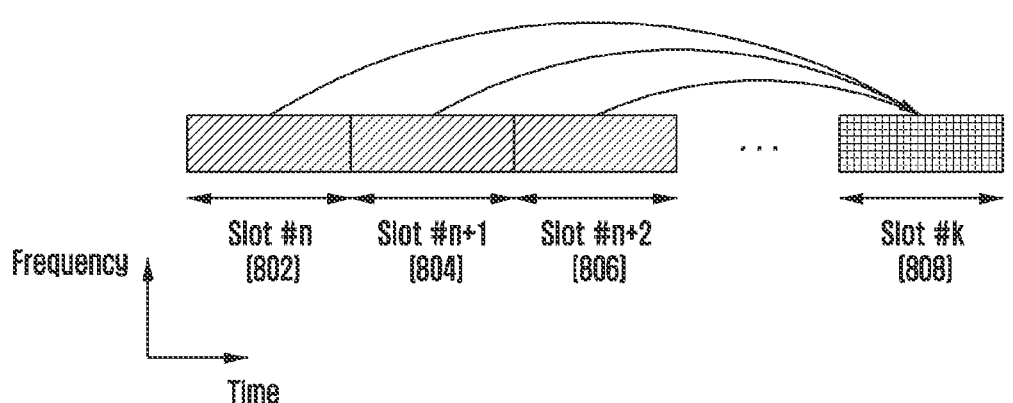
FIG. 8 is a diagram illustrating a method for configuring a semi-static hybrid automatic repeat request (HARQ)-acknowledgement (ACK) codebook in the NR system according to an embodiment of the disclosure.

FIG. 8 is a diagram illustrating a method for configuring a semi-static HARQ-ACK codebook in the NR system according to an embodiment of the disclosure.

Figure 9:
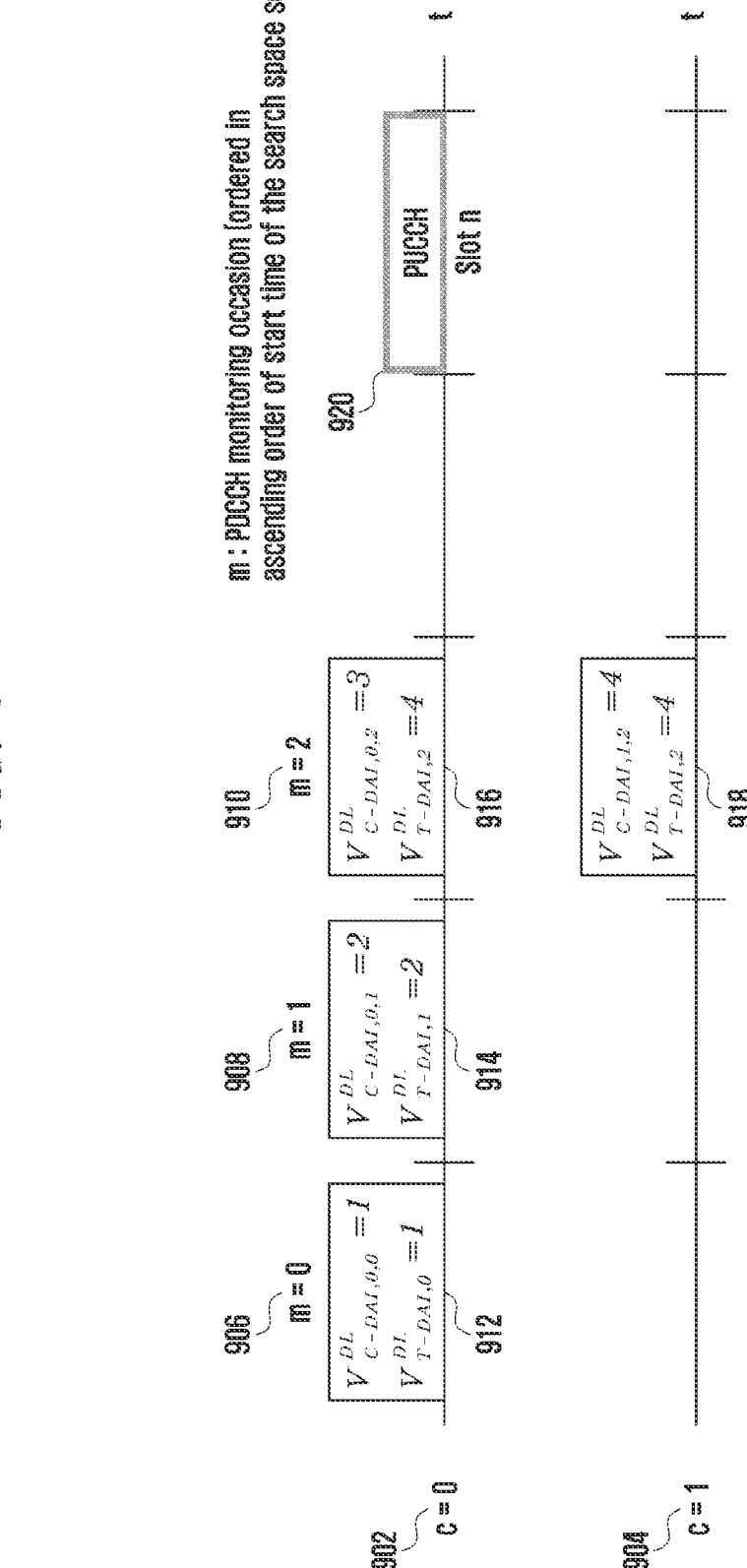
FIG. 9 is a diagram illustrating a method for configuring a dynamic HARQ-ACK codebook in a NR system according to an embodiment of the disclosure.

Referring to FIG. 9, when HARQ-ACK PUCCH, on which the terminal is able to perform transmission within one slot, is limited to one, if the terminal receives a semi-static HARQ-ACK codebook higher configuration, the terminal reports HARQ-ACK information relating to PDSCH reception or SPS PDSCH release in the HARQ-ACK codebook at a slot indicated by a value of a PDSCH-to-HARQ feedback timing indicator in DCI format 1_0 or DCI format 1_1. The terminal reports, as an NACK, a HARQ-ACK information bit value in the HARQ-ACK codebook at a slot that is not indicated by a PDSCH-to-HARQ feedback timing indicator field in DCI format 1_0 or DCI format 1_1. If the terminal reports only HARQ-ACK information for one SPS PDSCH release or one PDSCH reception in $M_{A,C}$ cases for candidate PDSCH reception, and when the report is scheduled by DCI format 1_0 including information indicating that a counter downlink assignment index (DAI) field indicates 1 in a PCell, the terminal determines one HARQ-ACK codebook for the SPS PDSCH release or the PDSCH reception.

The PDSCH-to-HARQ feedback timing indicator configures a value of K1, PDSCH is transmitted, and HARQ-ACK feedback is transmitted from the terminal to the base station after slot K1. A candidate set of possible K1 values is transferred via upper signaling, and a value of K1 may be determined using one value in the candidate set in DCI. K1 candidate values, which are HARQ-ACK feedback timing information for PDSCH, may be determined by default, for example, 1,2,3,4,5,6,7, and 8, and the base station or a transmission end may configure the set of the K1 candidate values via upper signaling. For example, the set of K1 candidate values may be configured as 2, 4, 6, 8, 10, 12, 14, and 16, and one of these values may be indicated by DCI.

Otherwise, a method of determining HARQ-ACK codebook according to the method described below is followed.

If a set of PDSCH reception candidate cases in a serving cell c is $M_{A,C}$, $M_{A,C}$ may be obtained by the following [pseudo-code 1] steps.

[Start of Pseudo-Code 1]

Step 1: Initializing j to 0, and $M_{A,C}$ to an empty set. Initializing k, i.e., a HARQ=−ACK transmission timing index, to 0.

Step 2: Configuring R for a set of respective rows in a table including slot information, start symbol information, a symbol number, or length information, to which PDSCH is mapped. If a PDSCH available mapping symbol indicated by each value of R is configured for an UL symbol according to DL and UL configuration performed at a higher level, a corresponding row is deleted from R.

Step 3-1: The terminal may receive one unicast PDSCH in one slot, and if R is not an empty set, one unicast PDSCH is added to set $M_{A,C}$.

Step 3-2: If the terminal can receive more than one unicast PDSCHs in one slot, the number of PDSCHs that can be assigned to different symbols in the calculated R is counted, and a corresponding number of unicast PDSCHs are added to $M_{A,C}$.

Step 4: Increasing k by 1 and starting over from step 2.

[End of Pseudo-Code 1]

In the described pseudo-code 1, referring to FIG. 8 as an example, in order to perform HARQ-ACK PUCCH transmission at slot #k 808, all slot candidates available for PDSCH-to-HARQ-ACK timing capable of indicating slot #k 808 are considered. In FIG. 8, it is assumed that HARQ-ACK transmission is possible at slot #k 808 by a PDSCH-to-HARQ-ACK timing combination available only for PDSCHs scheduled at slot #n 802, slot #n+1 804, and slot #n+2 806. In consideration of time domain resource configuration information of PDSCH available for scheduling at each of slot 802, 804, and 806 and information indicating whether a symbol within a slot is for downlink or uplink, the number of PDSCHs available for maximum scheduling for each slot is derived. For example, when two PDSCHs in slot 802, three PDSCHs in slot 804, and two PDSCHs in slot 806 are available for maximum scheduling, the maximum number of PDSCHs included in the HARQ-ACK codebook transmitted at slot 808 is a total of seven. This is referred to as cardinality of the HARQ-ACK codebook.

Step 3-2 in a specific slot will be described in detail with reference to Table 11 below.

TABLE 11

| Row index | dmrs-TypeA-position | PDSCH mapping type | $K_0$ | S | L | Ending | Order |
|---|---|---|---|---|---|---|---|
| 1 | 2 | Type A | 0 | 2 | 12 | 13 | 1× |
|   | 3 | Type A | 0 | 3 | 11 | 13 | 1× |
| 2 | 2 | Type A | 0 | 2 | 10 | 11 | 1× |
|   | 3 | Type A | 0 | 3 | 9 | 11 | 1× |
| 3 | 2 | Type A | 0 | 2 | 9 | 10 | 1× |
|   | 3 | Type A | 0 | 3 | 8 | 10 | 1× |
| 4 | 2 | Type A | 0 | 2 | 7 | 8 | 1× |
|   | 3 | Type A | 0 | 3 | 6 | 8 | 1× |
| 5 | 2 | Type A | 0 | 2 | 5 | 6 | 1× |
|   | 3 | Type A | 0 | 3 | 4 | 6 | 1× |
| 6 | 2 | Type B | 0 | 9 | 4 | 12 | 2× |
|   | 3 | Type B | 0 | 10 | 4 | 13 | 3 |
| 7 | 2 | Type B | 0 | 4 | 4 | 7 | 1× |
|   | 3 | Type B | 0 | 6 | 4 | 9 | 2 |
| 8 | 2, 3 | Type B | 0 | 5 | 7 | 11 | 1× |
| 9 | 2, 3 | Type B | 0 | 5 | 2 | 6 | 1× |
| 10 | 2, 3 | Type B | 0 | 9 | 2 | 10 | 2× |
| 11 | 2, 3 | Type B | 0 | 12 | 2 | 13 | 3× |
| 12 | 2, 3 | Type A | 0 | 1 | 13 | 13 | 1× |
| 13 | 2, 3 | Type A | 0 | 1 | 6 | 6 | 1× |
| 14 | 2, 3 | Type A | 0 | 2 | 4 | 5 | 1 |
| 15 | 2, 3 | Type B | 0 | 4 | 7 | 10 | 1× |
| 16 | 2, 3 | Type B | 0 | 8 | 4 | 11 | 2× |

Table 11 is a time resource assignment table in which, in the case of a general cyclic prefix (CP), the terminal is configured to be default and operates before receiving time resource assignment via a separate RRC signal. For reference, a PDSCH time resource assignment value is determined by dmrs-TypeA-Position, which is a terminal-common RRC signal, in addition to separately indicating a row index value by RRC. In Table 11, an ending column and an order column are added values for the convenience of description and may not actually exist. The ending column refers to an end symbol of a scheduled PDSCH, and the order column refers to a position value of a code located in a specific codebook in the semi-static HARQ-ACK codebook. The table is applied to time resource assignment applied to DCI format 1_0 in a common search region of the PDCCH.

In order to determine the HARQ-ACK codebook by calculating the maximum number of PDSCHs that do not overlap in a specific slot, the terminal performs the following steps.

Step 1: Searching for a PDSCH assignment value that allows PDSCH to end first in a slot, among all rows of the PDSCH time resource assignment table. In Table 11, it can be seen that row index 14 ends first. Row index 14 here is marked as 1 in the order column. Other row indices corresponding to PDSCHs that overlap, by at least one symbol, with PDSCH of row index 14 are marked as 1× in the order column.

Step 2: Searching for a PDSCH assignment value that allows PDSCH to end first among the remaining row indices which are not indicated in the order column. In Table 11, this corresponds to a row with a row index of 7 and a dmrs-TypeA-Position value of 3. Other row indices corresponding to PDSCHs that overlap, by at least one symbol, with PDSCH of the corresponding row index are marked as 2x in the order column.

Step 3: Repeating step 2, and increasing and displaying the order value. For example, in Table 11, a PDSCH assignment value, which allows PDSCH to end first, among row indices that are not indicated in the order column is retrieved. In Table 11, this corresponds to a row with a row index of 6 and a dmrs-TypeA-Position value of 3. Other row indices corresponding to PDSCHs that overlap, by at least one symbol, with PDSCH of the corresponding row index are marked as 3x in the order column.

Step 4: If the order is marked for all row indices, performing termination. The size of a corresponding order corresponds to the maximum number of PDSCHs available for scheduling without time overlap in a corresponding slot. Scheduling without time overlap means that different PDSCHs are scheduled by time division multiplexing (TDM).

In the order column of Table 11, a maximum value of the order refers to the cardinality of the HARQ-ACK codebook of a corresponding slot, and an order value refers to a HARQ-ACK codebook point at which a HARQ-ACK feedback bit for a corresponding scheduled PDSCH is located. For example, row index 16 of Table 11 indicates presence at a second code position in a semi-static HARQ-ACK codebook with the cardinality of 3. The terminal which transmits HARQ-ACK feedback may obtain $M_{A,C}$ via pseudo-code 1 or pseudo-code 2 steps if a set of PDSCH reception candidate occasions in serving cell c is $M_{A,C}$. $M_{A,C}$ may be used for determining the number of HARQ-ACK bits to be transmitted by the terminal Specifically, the HARQ-ACK codebook may be configured using the cardinality of the $M_{A,C}$ set.

As another example, considerations for determining the semi-static HARQ-ACK codebook (or HARQ-ACK codebook type 1) may be as follows.

a) on a set of slot timing values $K_1$ associated with the active UL BWP a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0 b) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by PDSCH-TimeDomainResourceAllocationList in PDSCH-Config Common or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{DL}$ provided by subcarrierSpacing in BWP-Downlink and BWP-Uplink for the active DL BWP and the active UL BWP, respectively d) if provided, on TDD-UL-DL-Configuration Common and TDD-UL-DL-ConfigDedicated as described in Subclause 11.1.

As still another example, a pseudo-code for HARQ-ACK codebook determination may be as follows.

[Start of Pseudo-code 2]

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

Set j = o − index of occasion for candidate PDSCH reception or SPS PDSCH release Set B = Ø

Set $M_{A,c}$ = Ø

Set $\mathcal{C}$ ($K_1$) to the cardinality of set $K_1$

Set k =0 − index of slot timing values $K_{1,k}$, in descending order of the slot timing values, in set $K_1$ for serving cell c while k < $\mathcal{C}$ ($K_1$ )

if mod ($n_U$ − $K_{1,k}$ +1, max($2^{\mu_{UL}-\mu_{DL}}$ ,1))=0

Set $n_D$ = o − index of a DL slot within an UL slot while $n_D$ < max($2^{\mu_{DL}-\mu_{UL}}$ ,1)

Set R to the set of rows

Set $\mathcal{C}$ (R) to the cardinality of R

Set r = 0 − index of row in set R if slot $n_U$ starts at a same time as or after a slot for an active DL BWP change on serving cell $\mathcal{C}$ or an active UL BWP change on the PCell and slot $\lfloor (n_U − K_{1,k}) \cdot 2^{\mu_{DL}-\mu_{UL}} \rfloor$ + $n_D$ is before the slot for the active DL BWP change on serving cell $\mathcal{C}$ or the active UL BWP change on the PCell continue;

else while r < $\mathcal{C}$ (R)

if the UE is provided TDD-UL-DL-ConfigurationCommon or TDD-UL-DL-ConfigDedicated and, for each slot from slot $$\lfloor (n_U - K_{1,k}) \cdot 2^{\mu_{DL}-\mu_{UL}} \rfloor + n_D - N_{PDSCH}^{repeat} + 1 \text{ to slot} \lfloor (n_U - K_{1,k}) \cdot 2^{\mu_{DL}-\mu_{UL}} \rfloor + n_D,$$

at least one symbol of the PDSCH time resource derived by row r is configured as UL where $K_{1,k}$ is the k-th slot timing value in set $K_1$ , R = R\r ;

end if r = r + 1;

end while if the UE does not indicate a capability to receive more than one unicast PDSCH per slot and R ≠ Ø, $M_{A,c}$ = $M_{A,c}$ ∪ j ;

j = j +1 ;

The UE does not expect to receive SPS PDSCH release and unicast PDSCH in a same slot;

else

Set $\mathcal{C}$ (R) to the cardinality of R

Set m to the smallest last OFDM symbol index, as determined by the SLIV, among all rows of R while R ≠ Ø, Set r = 0 while r < $\mathcal{C}$ (R)

if S ≤ m for start OFDM symbol index S for row r $b_{r,k,n_D}$ = j; − index of occasion for candidate PDSCH reception or SPS PDSCH release associated with row r R = R\r ;

B = B∪$b_{r,k,n_D}$ ;

end if r = r +1;

end while $M_{A,c}$ = $M_{A,c}$ ∪ j;

j = j + 1 ;

set m to the smallest last OFDM symbol index among all rows of R;

end while end if end if $n_D$ = $n_D$ + 1;

end while end if k = k + 1;

end while

[End Pseudo-code 2]

FIG. 9 is a diagram illustrating a method for configuring a dynamic HARQ-ACK codebook in the NR system according to an embodiment of the disclosure.

Referring to FIG. 9, based on a PDSCH-to-HARQ_feedback timing value for PUCCH transmission of HARQ-ACK information at slot n for PDSCH reception or SPS PDSCH release, and $K_0$ that is transmission slot position information of PDSCH for scheduling in DCI format 1_0 or 1_1, the terminal transmits HARQ-ACK information transmitted within one PUCCH in slot n. Specifically, for the described HARQ-ACK information transmission, on the basis of a DAI included in DCI indicating PDSCH or SPS PDSCH release, the terminal determines the HARQ-ACK codebook of PDCCH transmitted at the slot determined by $K_0$ and PDSCH-to-HARQ feedback timing.

The DAI includes a counter DAI and a total DAI. The counter DAI is information in which the HARQ-ACK information corresponding to PDSCH scheduled in DCI format 1_0 or DCI format 1_1 indicates a position in the HARQ-ACK codebook. Specifically, a value of the counter DAI in the DCI format 1_0 or DCI format 1_1 indicates a cumulative value of PDSCH reception or SPS PDSCH release scheduled by DCI format 1_0 or DCI format 1_1 in specific cell c. The cumulative value is configured based on a PDCCH monitoring occasion and a serving cell in which the scheduled DCI exists.

The total DAI is a value indicating the cardinality of the HARQ-ACK codebook. Specifically, a value of the total DAI refers to the total number of PDSCH or SPS PDSCH releases, which have been scheduled at a previous time including a point in time at which the DCI has been scheduled. The total DAI is a parameter used when HARQ-ACK information in serving cell c also includes HARQ-ACK information about PDSCH scheduled in another cell including serving cell c in a carrier aggregation (CA) situation. In other words, there is no total DAI parameter in a system operating with one cell.

FIG. 9 is a diagram illustrating an example of an operation for the DAI. In FIG. 9, a terminal transmits, on PUCCH 920, a HARQ-ACK codebook selected based on a DAI 902 at an n-th slot of carrier 0, in a situation where two carriers are configured, and FIG. 9 illustrates a change in values of the total DAI (T-DAI) and the counter DAI (C-DAI) indicated by DCI retrieved for each PDCCH monitoring time point configured for each carrier. First, each of the C-DAI and the T-DAI in the DCI 906 retrieved at m=0 indicates a value 912 of 1. Each of the C-DAI and the T-DAI in the DCI 908 retrieved at m=1 indicates a value 914 of 2. The C-DAI indicates a value 916 of 3 in DCI 910 retrieved in carrier 0 (c=0) 902 of m=2. The C-DAI indicates a value 918 of 4 in DCI 910 retrieved in carrier 1 (c=1) 904 of m=2. If carriers 0 and 1 are scheduled at the same monitoring time point, all T-DAIs are indicated by 4.

Referring to FIGS. 8 and 9, HARQ-ACK codebook determination is performed when only one PUCCH including HARQ-ACK information is transmitted in one slot. This is referred to as mode 1. As an example of a method of allowing one PUCCH transmission resource to be determined in one slot, when PDSCHs scheduled in different DCI are multiplexed and transmitted to one HARQ-ACK codebook in the same slot, a PUCCH resource selected for HARQ-ACK transmission is indicated by a PUCCH resource field indicated in DCI for last scheduling of PDSCH. That is, the PUCCH resource indicated by the PUCCH resource field indicated in DCI scheduled before the DCI is ignored.

The following explanation describes HARQ-ACK codebook determination method and devices in a situation where two or more PUCCHs including HARQ-ACK information may be transmitted in one slot. This is referred to as mode 2. It may be possible that the terminal operates only in mode 1 (only one HARQ-ACK PUCCH transmission in one slot) or operates only in mode 2 (one or more HARQ-ACK PUCCH transmissions in one slot). Alternatively, it may be possible that the terminal supporting both mode 1 and mode 2 is configured so that the base station operates in only one mode by upper signaling, or a mode to be implicitly operated by a DCI format, an RNTI, a DCI specific field value, scrambling, etc. is determined to be mode 1 or mode 2. For example, PDSCH scheduled in DCI format A and HARQ-ACK information associated therewith may be based on mode 1, and PDSCH scheduled in DCI format B and HARQ-ACK information associated therewith may be based on mode 2.

Whether the HARQ-ACK codebook is semi-static or dynamic is determined by an RRC signal.

First Embodiment

Figure 10:
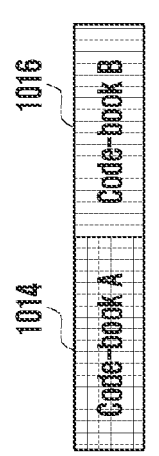
FIG. 10 is a diagram illustrating an example of reporting feedback by a terminal in a situation where a plurality of physical downlink shared channels (PDSCHs) are received according to an embodiment of the disclosure.
Figure 10:
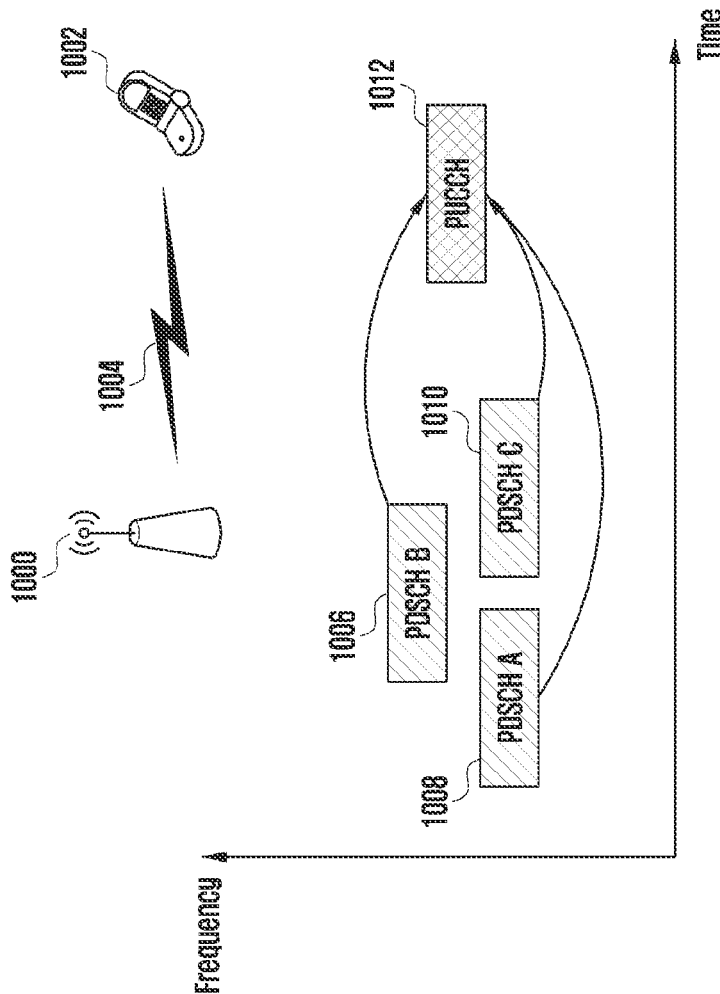

FIG. 10 is a diagram illustrating an example of reporting feedback by a terminal in a situation where a plurality of PDSCHs are received according to an embodiment of the disclosure.

Referring to FIG. 10, it may be possible that a terminal 1002 concurrently supports services, such as eMBB and URLLC, in the 5G or NR system. Such a terminal may be defined to have capability and may be able to report the capability thereof to a base station 1000. For example, if there is no separate capability report, the base station may determine a terminal to be an eMBB terminal, or if a terminal reports capability, the base station may determine whether the terminal supports only eMBB or supports only URLLC, or the base station may determine whether the terminal supports both eMBB and URLLC. Alternatively, the terminal may be able to report which service the terminal supports as another function without description of eMBB and URLLC. An example of the function may include a maximum number of PDSCHs that can be received or a maximum number of PUSCHs that can be transmitted, by a TDM scheme within a slot. Alternatively, such a function may include a maximum number of PDSCHs that can be received or a maximum number of PUSCHs that can be transmitted, by a frequency division multiplexing (FDM) scheme within one slot in one cell. In addition to the above description, the terminal may report the capability thereof to the base station. After the report, the terminal 1002 and the base station 1000 may transmit or receive data 1004 for an URLLC service and an eMBB service.

If it is possible for the terminal to receive a plurality of PDSCHs in an FDM scheme, concurrently receiving PDSCH A 1008 and PDSCH B 1006, or PDSCH B 1006 and PDSCH C 1010 in the FDM scheme may be possible as described in FIG. 10. The PDSCH may be all for an eMBB service or for a URLLC service, or a part of PDSCH may be for the eMBB service and the remaining PDSCHs may be for the URLLC service. Here, a method of determining whether a specific PDSCH is associated with a service scheme, such as eMBB or URLLC, may be as follows.

Method 1: DCI Format

For example, the terminal is able to determine that PDSCH or PUSCH scheduled in DCI format A is for eMBB, and that PDSCH or PUSCH scheduled in DCI format B is for URLLC.

Method 2: RNTI

For example, the terminal is able to determine that PDSCH or PUSCH scheduled in DCI format including CRC scrambled with A RNTI is for eMBB, and that PDSCH or PUSCH scheduled in DCI format including CRC scrambled with B RNTI is for URLLC.

Method 3: CORESET/Search Space

It may be possible that service-related configuration information, such as eMBB or URLLC, is included in reception of CORESET-related RRC configuration information or search space-related RRC configuration information, which the terminal receives to search for PDCCH. Therefore, it may be possible that a DCI format detected in the search space or the CORESET referred to as the eMBB service indicates PDSCH or PUSCH for the eMBB service on the basis of RRC configuration information.

Method 4: Specific DCI Field or RRC Signal

It may be possible that a particular DCI field value implicitly indicates an eMBB or a URLLC service, or it may be possible to use a separate DCI field to indicate an eMBB or URLLC service. The method may be used for dynamically indicating a service. For example, the terminal may determine whether the PDSCH or the PUSCH corresponds to eMBB or URLLC via a specific field value of the DCI format having scheduled a specific PDSCH or PUSCH. Alternatively, the terminal may determine, by an RRC signal, whether the PDSCH or PUSCH scheduled after RRC configuration corresponds to eMBB or URLLC.

It may be possible to determine, by a combination of a part of the methods, whether priority of scheduled PDSCH or PUSCH or priority of HARQ-ACK information for PDSCH is low such as eMBB or high such as URLLC. For example, if the terminal receives configuration of only one of DCI format 0_1/1_1 and DCI format 0_2/1_2 except for DCI format 0_0/1_0, which is a fallback DCI, from the base station, the terminal determines, by a field for determination of the priority with respect to one DCI format of DCI format 0_1/1_1 or DCI format 0_2/1_2, whether the priority of scheduled PDSCH or PUSCH or the priority of HARQ-ACK information for PDSCH is low such as eMBB or high such as URLLC.

As another example, if the terminal receives configuration of all of DCI format 0_1/1_1 and DCI format 0_2/1_2 except DCI format 0_0/1_0, which is a fallback DCI, from the base station, the terminal determines, by a the DCI format, whether the priority of scheduled PDSCH or PUSCH by a field for determination of the priority or the priority of HARQ-ACK information for scheduled PDSCH by a field for determination of the priority is low such as eMBB or high such as URLLC. For example, the terminal determines, by DCI format 0_2/1_2, that the priority of scheduled PDSCH or PUSCH or the priority of HARQ-ACK information for PDSCH is high. On the other hand, the terminal determines, by DCI format 0_1/1_1, that the priority of scheduled PDSCH or PUSCH or the priority of HARQ-ACK information for PDSCH is low.

1-1th Embodiment

The above-described example is a description relating to a situation in which whether a specific PDSCH corresponds to eMBB or URLLC may be determined in a physical layer, and in reality, it may be possible that a terminal determines the same in an upper layer equal to MAC or higher instead of in the physical layer. In such a case, it may not be possible to determine whether the PDSCH corresponds to eMBB or URLLC in the physical layer. The above description and the following description mainly describe eMBB and URLLC, but this may be applied interchangeably with unicast, groupcast, or broadcast.

For example, FIG. 10 illustrates an example in which the terminal receives one or more PDSCHs in at least partially overlapped symbols in a situation where PDSCH A and PDSCH C correspond to eMBB and PDSCH B corresponds to URLLC. In a situation where a PUCCH resource 1012, on which HARQ-ACK feedback information for a corresponding PDSCH is to be transmitted, may be indicated by RRC or DCI, if HARQ-ACK feedback information corresponding to the PDSCHs A, B, and C is transmitted at the same PUCCH resource 1012, it may be possible that a HARQ-ACK codebook to be transmitted on the PUCCH resource 1012 includes a combination of HARQ-ACK codebooks configured for each service type.

Specifically, it may be possible to combine a HARQ-ACK codebook 1014, which may include a PDSCH resource assignment table in a DCI format for scheduling for eMBB, and a HARQ-ACK codebook 1016 which may include a PDSCH resource assignment table in a DCI format for scheduling for URLLC. Here, it may be possible that a HARQ-ACK codebook concatenation scheme or order is combined regardless of services, but if a PUCCH format, in which a HARQ-ACK codebook or a bit (sequence) is transmitted, is transmitted using a polar code, because bits placed in subordinated order may be transmitted more reliably than bits placed in priority, (for reliability of URLLC transmission) it may be advantageous in terms of HARQ-ACK codebook transmission that a URLLC codebook field 1016 is placed after an eMBB codebook field 1014.

In the case of using a semi-static HARQ-ACK codebook, the terminal determines a maximum number of PDSCHs available for scheduling without overlapping in terms of symbols (or time) on the basis of the union of time resource assignment information fields configured in all DCI formats enabling URLLC PDSCH scheduling, and the terminal determines a HARQ-ACK codebook cardinality on the basis of a difference value (slot offset) between a slot at which PDSCH is transmitted and a slot at which HARQ-ACK information is transmitted. A HARQ-ACK codebook for eMBB PDSCH may also be configured similarly to that for URLLC PDSCH. Therefore, it is possible to apply the above-described pseudo-code 1 or pseudo-code 2 for each eMBB and URLLC service. As finally described above, each applied HARQ-ACK codebook may be configured in a form, in which the URLLC codebook is concatenated subsequently to the eMBB codebook, and transmitted to the base station.

As another example, a HARQ-ACK feedback transmission resource may be configured for each terminal using RRC signaling and/or DCI. The terminal may determine the number of HARQ-ACK bits from the union of a PDSCH mapping assignment table for URLLC and a PDSCH mapping assignment table for eMBB. For example, Table 12 below may be a table for assigning an eMBB PDSCH resource to a specific terminal, and a separate table, e.g., Table 13 below, may be used for URLLC PDSCH resource assignment.

35

TABLE 12

| Row index | dmrs-TypeA-position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 13

| Row index | dmrs-TypeA-position | PDSCH mapping type | $K_0$ | S | L |
|---|---|---|---|---|---|
| 1 | 2 | Type A | 0 | 2 | 6 |
|  | 3 | Type A | 0 | 3 | 5 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 6 | 4 |
|  | 3 | Type B | 0 | 8 | 2 |
| 7 | 2 | Type B | 0 | 4 | 4 |
|  | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

Under an assumption that two PDSCHs cannot be mapped to an identical OFDM symbol, up to three PDSCHs may be assigned to one slot according to Tables 12 and 13 above.

If a specific terminal is configured by a base station so as to receive URLLC PDSCH and eMBB PDSCH, and is configured to use a semi-static HARQ-ACK codebook for HARQ-ACK feedback transmission, a method of configuring a HARQ-ACK codebook is provided below.

If URLLC PDSCH and eMBB PDSCH may be mapped to an identical OFDM symbol and transmitted, the terminal includes a HARQ-ACK codebook for the URLLC PDSCH (it may be referred to as HARQ-ACK_codebook_URLLC), and includes a separate HARQ-ACK codebook for the eMBB PDSCH (it may be referred to as HARQ-ACK_codebook_eMBB). The URLLC PDSCH HARQ-ACK codebook and the eMBB PDSCH HARQ-ACK codebook may be configured based on different tables, and for example, may be configured based on Tables 12 and 13, respectively. The terminal includes each of the HARQ-ACK codebooks as described above, connects two codebooks, and then encodes and transmits the same. A connection method in this case is characterized by concatenating the URLLC PDSCH HARQ-ACK codebook subsequently to the eMBB PDSCH HARQ-ACK codebook. If the HARQ-ACK codebooks are encoded with polar coding, the transmission reliability is improved for the codebook concatenated with a subordinated rank, and because URLLC is a service having a higher reliability compared to eMBB, the above scheme may be a reasonable method in a situation where two codebooks are concurrently transmitted.

Alternatively, due to a difference in requirements, such as reliability, the eMBB PDSCH HARQ-ACK codebook and the URLLC PDSCH HARQ-ACK codebook may be separately configured and transmitted via different PUCCH resources, and if PUCCH resources including two codebooks overlap at least in terms of time resources, the terminal transmits PUCCH including the URLLC PDSCH HARQ-ACK codebook and does not transmit PUCCH including the eMBB PDSCH HARQ-ACK codebook. In addition to PUCCH collision, if PUCCH including the eMBB PDSCH HARQ-ACK codebook overlaps in at least one symbol with other UL transmission resources (PUCCH including PUSCH, scheduling request (SR), and channel state information (CSI)) having high reliability, the terminal does not transmit the PUCCH including the eMBB PDSCH HARQ-ACK codebook.

The terminal may configure a HARQ-ACK codebook via the following process. The terminal receives, from a transmission end, configuration of a $K_1$ candidate value which is HARQ feedback timing information and a table including the number of symbols and length information, start symbol information, slot information to which PDSCH is mapped via upper signaling. The table may be configured differently from a table for eMBB PDSCH and a table for the URLLC PDSCH. Thereafter, the terminal receives scheduling information for eMBB PDSCH transmission and scheduling information for URLLC PDSCH transmission from the transmission end. Whether scheduling information is related to eMBB or URLLC may be determined by the above-described methods 1 to 4. In other words, it is possible that the eMBB PDSCH and the URLLC PDSCH are determined and applied by methods 1 to 4. The scheduling information may be referred to as DCI, and the DCI may include a bit field indicating one index value in the table in order to transfer resource assignment information, and a bit field indicating one of $K_1$ candidate values in order to transfer HARQ-ACK feedback timing information. Alternatively, one of the index values and/or $K_1$ candidate values may be indicated to the terminal by another method, such as upper signaling or predetermination.

According to scheduling information, the terminal having received eMBB PDSCH and URLLC PDSCH configures a HARQ-ACK codebook by checking eMBB PDSCH and URLLC PDSCH reception results. The terminal may obtain $M_{A,C}$ by using pseudo-code 1 or pseudo-code 2, or may sequentially connect the eMBB PDSCH HARQ-ACK codebook and the URLLC PDSCH HARQ-ACK codebook to form an whole HARQ-ACK codebook. The terminal encodes the configured HARQ-ACK codebook and then transmits the same to the transmission end on a configured resource. After transmission of a HARQ-ACK codebook signal, if the HARQ-ACK codebook indicates reception of no data (for example, if NACK is indicated), the terminal may receive retransmitted URLLC PDSCH data and/or eMBB PDSCH data from the transmission end.

In other words, HARQ-ACK codebook cardinality determined in a specific slot is [eMBB PDSCH HARQ-ACK codebook cardinality+URLLC PDSCH HARQ-ACK codebook cardinality], and HARQ-ACK codebook order is the same as [eMBB PDSCH HARQ-ACK codebook 1014, and URLLC PDSCH HARQ-ACK codebook 1016]. In more detail, the eMBB PDSCH HARQ-ACK codebook may be configured based on a time resource assignment table configured via an RRC signal enabling eMBB PDSCH to be scheduled, and the URLLC PDSCH HARQ-ACK codebook may be configured via an RRC signal enabling URLLC PDSCH to be scheduled. In the disclosure, for the convenience of explanation, description is made with an eMBB PDSCH HARQ-ACK codebook and a URLLC PDSCH HARQ-ACK codebook. However, instead, the described codebooks can be sufficiently replaced by a technique, such as a PDSCH HARQ-ACK codebook scheduled in DCI format A (or a HARQ-ACK codebook related to PDSCH scheduled in DCI format A) or a PDSCH HARQ-ACK codebook scheduled in a DCI format with A-RNTI (or a HARQ-ACK codebook related to PDSCH scheduled in a DCI format with A-RNTI).

1-2th Embodiment

In a method of concurrently transmitting HARQ-ACK codebooks for two PDSCHs by the terminal having received eMBB PDSCH and URLLC PDSCH, it is assumed that eMBB and URLLC can be basically determined in a physical layer. Further, it is assumed that one eMBB PDSCH and one URLLC PDSCH overlap in at least some symbols. In other words, operation definition of a new terminal is required for two or more eMBB PDSCHs and/or URLLC PDSCHs. If eMBB and URLLC are not determined in the physical layer, such a method may not be applicable. In other words, in a situation where the terminal receives two or more PDSCHs in at least a part of the same OFDM symbols without distinguishing between services such as eMBB and URLLC (that is a case where PDSCHs are frequency multiplexed), a HARQ-ACK codebook design method needs to be considered.

If the maximum number of PDSCHs that can be received in at least a part of the same OFDM symbols varies for each terminal, the terminal may report capability thereof to the base station. In consideration of this, it may be possible that the base station may configure, via an RRC signal, the maximum number of PDSCHs that can be transmitted to one terminal in the same OFDM symbol by the base station. In this situation, if the terminal is configured to use a semi-static HARQ-ACK codebook, the terminal determines a feedback bit to be transmitted by $K_1$ candidate values, i.e., HARQ-ACK feedback timing information, and a table (or slot information, start symbol information, and the number of symbols or length information according to the table) including the number of symbols or length information, start symbol information, and slot information to which PDSCH is mapped. The table including the number of symbols or length information, start symbol information, and slot information to which PDSCH is mapped may include a table according to a default value, and may also include a table that the base station can configure for the terminal. As described above, under the assumption that two PDSCHs cannot be mapped to an identical OFDM symbol, up to three PDSCHs may be assigned to one slot according to the tables. However, in a situation where two or more PDSCHs may be mapped (or scheduled) to an identical OFDM symbol, HARQ-ACK codebook cardinality for a corresponding slot may be determined by the following methods.

Method 1: Determining the cardinality of a HARQ-ACK codebook on the basis of [the maximum number of PDSCHs that a terminal may receive at an identical OFDM symbol reported to a base station]×[the maximum number of PDSCHs that can be scheduled under an assumption that different PDSCHs cannot be mapped to an identical OFDM symbol].

Method 2: Determining the cardinality of a HARQ-ACK codebook on the basis of [the maximum number of PDSCHs that a terminal configured by a base station may receive at an identical OFDM symbol]×[the maximum number of PDSCHs that can be scheduled under an assumption that different PDSCHs cannot be mapped to an identical OFDM symbol].

A difference between the above-described methods 1 and 2 is that method 1 determines the semi-static HARQ-ACK codebook cardinality of a corresponding slot by the capability reported by the terminal (the maximum number of PDSCHs that the terminal can receive at an identical OFDM symbol), and method 2 determines the semi-static HARQ-ACK codebook cardinality of a corresponding slot according to a value that the base station separately configures within the capability reported by the terminal. For example, if [the maximum number of PDSCHs that can be scheduled under an assumption that different PDSCHs cannot be mapped to an identical OFDM symbol] is 3, and [the maximum number of PDSCHs that the terminal can receive at an identical OFDM symbol reported to the base station] is 5, the HARQ-ACK codebook cardinality in a corresponding slot is 15 according to method 1. Further, according to method 2, the base station may be able to configure a value smaller than 3 as [the maximum number of PDSCHs that the terminal configured by the base station can receive at an identical OFDM symbol], and if this value is 2, the HARQ-ACK codebook cardinality at the corresponding slot is 10. In the disclosure, for the convenience of description, [the maximum number of PDSCHs that the terminal can receive at an identical OFDM symbol reported to the base station] or [the maximum number of PDSCHs that the terminal configured by the base station can receive at an identical OFDM symbol] is denoted as $N_j$.

As another example, a set of HARQ-ACK codebook candidate positions $M_{A,C}$ for candidate PDSCH reception or candidate SPS PDSCH release may be determined according to the following pseudo-code with respect to a set of slot timing values $K_1$.

---

[Start of Pseudo-code 3]
Set j = 0 – index of occasion for candidate PDSCH reception or SPS PDSCH release
Set B = Ø
Set $M_{A,c}$ = Ø
Set $\mathcal{C}$ ($K_1$) to the cardinality of set $K_1$
Set k =0 – index of slot timing values $K_{1,k}$, in descending order of the slot timing values, in set $K_1$ for serving cell c
while k < $\mathcal{C}$ ($K_1$)
    if mod ($n_U$ – $K_{1,k}$ +1,max($2^{\mu_{UL}-\mu_{DL}}$ ,1))= 0

Set $n_D = o$ − index of a DL slot within an UL slot
while $n_D < \max(2^{\mu_{DL} - \mu_{UL}}, 1)$
    Set R to the set of rows
    Set $\mathcal{C}$ (R) to the cardinality of R
    Set r = 0 − index of row in set R
    if slot $n_U$ starts at a same time as or after a slot for an active DL BWP change on
    serving cell $\mathcal{C}$ or an active UL BWP change on the PCell and slot
    $\lfloor (n_U - K_{1,k}) \cdot 2^{\mu_{DL} - \mu_{UL}} \rfloor + n_D$ is before the slot for the active DL BWP change on serving
    cell $\mathcal{C}$ or the active UL BWP change on the PCell
        continue;
    else
      while r < $\mathcal{C}$ (R)
        if the UE is provided TDD-UL-DL-ConfigurationCommon or TDD-UL-DL-
          ConfigDedicated and, for each slot from slot $$\lfloor (n_U - K_{1,k}) \cdot 2^{\mu_{DL} - \mu_{UL}} \rfloor + n_D - N_{PDSCH}^{repeat} + 1 \text{ to slot} \lfloor (n_U - K_{1,k}) \cdot 2^{\mu_{DL} - \mu_{UL}} \rfloor + n_D,$$

at least one symbol of the PDSCH time resource derived by row r is configured
          as UL where $K_{1,k}$ is the k-th slot timing value in set $K_1$ ,
          R = R\r;
        end if
        r = r + 1;
      end while
      if the UE does not indicate a capability to receive more than one unicast PDSCH
      per slot and R ≠ Ø and the UE does not indicate a capability to simultaneously
      receive more than one unicast PDSCH per symbol,
        $M_{A,c} = M_{A,c} \cup j$ ;
        j = j + 1;
      The UE does not expect to receive SPS PDSCH release and unicast PDSCH in a
      same slot; else if the UE indicates a capability to receive more than one unicast
      PDSCH per slot and R ≠ Ø and the UE does not indicate a capability to
      simultaneously receive more than one unicast PDSCH per symbol,
        Set $\mathcal{C}$ (R) to the cardinality of R
        Set m to the smallest last OFDM symbol index, as determined by the SLIV,
      among all rows of R
        while R ≠ Ø
          Set r = 0
          while r < $\mathcal{C}$ (R)
            if S ≤ m for start OFDM symbol index S for row r
              $b_{r,k,n_D} = j$ ; − index of occasion for candidate PDSCH reception or SPS
              PDSCH release associated with row r
              R = R\r ;
              B = B$\cup b_{r,k,n_D}$;
            end if
          r = r + 1;
          end while
          $M_{A,c} = M_{A,c} \cup j$;
          j = j + 1;
          Set m to the smallest last OFDM symbol index among all rows of R ;
        end while
else if the UE indicates a capability to simultaneously receive more than one unicast
    PDSCH per symbol
        Set $\mathcal{C}$ (R) to the cardinality of R
        Set m to the smallest last OFDM symbol index, as determined by the SLIV,
      among all rows of R
        while R ≠ Ø
          Set r = 0
          while r < $\mathcal{C}$ (R)
            if S ≤ m for start OFDM symbol index S for row r
              $b_{r,k,n_D} = j$ ; − index of occasion for candidate PDSCH reception or SPS
              PDSCH release associated with row r
              R = R\r ;
              B = B$\cup b_{r,k,n_D}$ ;
            end if
          r = r + 1;
          end while
          $M_{A,c} = M_{A,c} \cup j$;
          j=j+$N_j$;
          Set m to the smallest last OFDM symbol index among all rows of R ;
        end while
      end if
    end if
    $n_D = n_D + 1$;
  end while
end if
k = k + 1;
end while
    [End of Pseudo-code 3]

After the HARQ-ACK codebook is determined as described above, information of a HARQ-ACK codebook position at which HARQ-ACK feedback information for scheduled PDSCH is to be located may be determined by the following methods.

Method 1: Defining by Pseudo-Code

Method 1 is a method for allowing a codebook candidate position to be determined for each specific PDSCH when a set of HARQ-ACK codebook candidate positions $M_{A,C}$ for candidate PDSCH reception or candidate SPS PDSCH release is determined according to the following pseudo-code with respect to a set of slot timing values $K_1$. This method may be determined by the following pseudo-code.

```
[Start of Pseudo-code 4]
Set j = o − index of occasion for candidate PDSCH reception or SPS PDSCH release
Set B = Ø
Set M A,c = Ø
Set 𝒞 (K₁) to the cardinality of set K₁
Set k =0 − index of slot timing values K₁,ₖ , in descending order of the slot timing values, in set
K₁ for serving cell c
while k < 𝒞 (K₁)
    if mod (n_U − K₁,ₖ +1,max(2^(μUL-μDL) ,1))= 0
        Set n_D = o − index of a DL slot within an UL slot
        while n_D <max(2^(μDL-μUL) ,1)
            Set R to the set of rows
            Set 𝒞 (R) to the cardinality of R
            Set r = 0 − index of row in set R
            if slot n_U starts at a same time as or after a slot for an active DL BWP change on
            serving cell 𝒞 or an active UL BWP change on the PCell and slot
            ⌊(n_U − K₁,ₖ)·2^(μDL-μUL) ⌋+ n_D is before the slot for the active DL BWP change on serving
            cell 𝒞 or the active UL BWP change on the PCell
                continue;
            else
                while r < 𝒞 (R)
                    if the UE is provided TDD-UL-DL-ConfigurationCommon or TDD-UL-DL-
                        ConfigDedicated and, for each slot from slot ⌊(n_U − K₁,ₖ) · 2^(μDL-μUL) ⌋ + n_D − N^repeat_PDSCH + 1 to slot⌊(n_U − K₁,ₖ) · 2^(μDL-μUL) ⌋ + n_D, at least one symbol of the PDSCH time resource derived by row r is configured
                        as UL where K₁,ₖ is the k-th slot timing value in set K₁ ,
                        R = R\r;
                    end if
                    r = r + 1;
                end while
                if the UE does not indicate a capability to receive more than one unicast PDSCH
                per slot and R ≠ Ø and the UE does not indicate a capability to simultaneously
                receive more than one unicast PDSCH per symbol,
                    M A,c = M A,c ∪ j;
                    j = j + 1;
                    The UE does not expect to receive SPS PDSCH release and unicast PDSCH in
                        a same slot;
                else if the UE indicates a capability to receive more than one unicast PDSCH per
                slot and R ≠ Ø and the UE does not indicate a capability to simultaneously receive
                more than one unicast PDSCH per symbol,
                    Set 𝒞 (R) to the cardinality of R
                    Set m to the smallest last OFDM symbol index, as determined by the SLIV,
                    among all rows of R
                    while R ≠ Ø
                        Set r = 0
                        while r < 𝒞 (R)
                            if S ≤ m for start OFDM symbol index S for row r
                                b_{r,k,nD} = j ; − index of occasion for candidate PDSCH reception or SPS
                                PDSCH release associated with row r
                                R = R\r;
                                B = B∪b_{r,k,nD} ;
                            end if
                        r = r + 1;
                        end while
                        M A,c = M A,c ∪ j;
                        j = j + 1;
                        Set m to the smallest last OFDM symbol index among all rows of R ;
                    end while
            else if the UE indicates a capability to simultaneously receive more than one unicast
                PDSCH per symbol
                    Set 𝒞 (R) to the cardinality of R
                    Set m to the smallest last OFDM symbol index, as determined by the SLIV,
```

```
among all rows of R
    while R ≠ Ø
        Set r = 0
        while r < 𝒞 (R)
            if S ≤ m for start OFDM symbol index S for row r
                b_{r,k,nD} = j + mod(r,N_j); – index of occasion for candidate PDSCH
                reception or SPS PDSCH release associated with row r
                R = R\r;
                B = B∪b_{r,k,nD} ;
            end if
            r = r + 1;
        end while
        M _{A,c} = M _{A,c} ∪ j;
        j = j + N_j;
        Set m to the smallest last OFDM symbol index among all rows of R ;
        end while
    end if
    end if
    n_D = n_D +1;
    end while
    end if
    k = k +1;
end while
    [End of Pseudo-code 4]
```

The above-described [pseudo-code 3] and [pseudo-code 4] are merely examples of unicast PDSCH, and may be sufficiently applied to groupcast PDSCH and broadcast PDSCH in addition to unicast PDSCH. Further, pseudo-codes 3 and 4 may be sufficiently applicable to a combination between at least one PDSCH among unicast, groupcast, and broadcast. Pseudo-codes 3 and 4 may be applicable to all PDSCHs that require HARQ-ACK feedback, without explicit description of unicast PDSCH, groupcast PDSCH or broadcast PDSCH. Such a technique is not limited to only pseudo-code 3 to pseudo-code 4, but is applicable to all pseudo-codes described in the disclosure.

Method 2: Indicating HARQ-ACK Codebook Position in DCI

This method informs HARQ-ACK codebook information separately from DCI for scheduling of PDSCH on the basis of [pseudo-code 3]. A field indicated by the HARQ-ACK codebook information may be a value determined in an individual HARQ-ACK codebook subgroup. For example, if [the maximum number of PDSCHs that can be scheduled under the assumption that different PDSCHs cannot be mapped to an identical OFDM symbol] is 3, there are a total of three HARQ-ACK codebook subgroups in a corresponding slot, and HARQ-ACK codebook cardinality has a value of $N_j$ for each subgroup. Therefore, a HARQ-ACK codebook group of the slot is configured in the form of $[N_j N_j N_j]$. Taking Table 11 as an example, it may be possible that orders indicated for respective PDSCH resource assignment indices are determined to indicate HARQ-ACK codebook subgroups according to the disclosure. The size of DCI indicating a position of specific HARQ-ACK feedback information within the HARQ-ACK codebook subgroup may be equal to $\lceil \log_2(N_j) \rceil$. As another example, in addition to DCI, it may be possible that a specific HARQ-ACK codebook position is preconfigured via an RRC signal or associated with each DCI format. For example, if $N_j$ is 2, a field indicating a position of an ACK/NACK bit in a codebook subgroup of 1 bit may be added to DCI, and in this case, if the 1 bit is configured as 0, an ACK/NACK bit for PDSCH scheduled by the DCI may be a first bit in $N_j$ (i.e., 2) bits, and if the 1 bit is configured as 1, the ACK/NACK bit for PDSCH scheduled by the DCI may be a second bit in $N_j$ (i.e., 2) bits. If there are three HARQ-ACK codebook subgroups in the slot, the total cardinality of the HARQ-ACK codebook in the slot is 2×3, which is 6.

Method 3: Implicitly Indicating HARQ-ACK Codebook Position Information by Existing DCI Field This method is similar to method 2, but information indicating a specific HARQ-ACK codebook position in a HARQ-ACK codebook subgroup is derived by a value of a conventional DCI field (instead of a field separately present in DCI). For example, it may be possible to inform of the specific HARQ-ACK codebook position via a DCI field indicating a HAR process number, and specifically, a mod (HARQ process number, $N_j$)+1 value may be HARQ-ACK codebook position information. As another example, a frequency resource assignment field, NDI, MCS, or the like may be used.

The described PDSCH refers to PDSCH scheduled by DCI or to PDSCH transmitted without a separate DCI indication, such as DL SPS.

As another example, the following [pseudo-code 5] or [pseudo-code 6] may be applied only to a terminal capable of receiving two or more unicast PDSCHs at an identical symbol, in addition to [pseudo-code 3] and [pseudo-code 4].

```
[Start of Pseudo-code 5]
Set j = 0 – index of occasion for candidate PDSCH reception or SPS PDSCH release
Set B = Ø
Set M _{A,c} = Ø
Set 𝒞 (K_1 ) to the cardinality of set K_1
Set k =0 – index of slot timing values K_{1,k}, in descending order of the slot timing values, in set
K_1 for serving cell c
while k < 𝒞 (K_1 )
    if mod (n_U − K_{1,k} +1,max(2^{μUL−μDL} ,1))= 0
        Set n_D = o – index of a DL slot within an UL slot
```

```
while n_D < max(2^{μDL−μUL} ,1)
    Set R to the set of rows
    Set𝒞 (R) to the cardinality of R
    Set r = 0 − index of row in set R
    if slot n_U starts at a same time as or after a slot for an active DL BWP change on
    serving cell𝒞 or an active UL BWP change on the PCell and slot
    ⌊(n_U − K_{1,k})·2^{μDL−μUL} ⌋+ n_D is before the slot for the active DL BWP change on serving
    cell𝒞 or the active UL BWP change on the PCell
            continue;
    else
        while r <𝒞 (R)
            if the UE is provided TDD-UL-DL-ConfigurationCommon or TDD-UL-DL-
                ConfigDedicated and, for each slot from slot
```

$$\lfloor(n_U − K_{1,k})·2^{μDL−μUL}\rfloor + n_D − N^{repeat}_{PDSCH} + 1 \text{ to slot}\lfloor(n_U − K_{1,k})·2^{μDL−μUL}\rfloor + n_D,$$

```
                at least one symbol of the PDSCH time resource derived by row r is configured
                as UL where K_{1,k} is the k-th slot timing value in set K_1 ,
                R = R\r ;
            end if
            r = r + 1;
        end while
        Set𝒞 (R) to the cardinality of R
        Set m to the smallest last OFDM symbol index, as determined by the SLIV,
    among all rows of R
        while R ≠ Ø
            Set r = 0
        while r <𝒞 (R)
            if S ≤ m for start OFDM symbol index S for row r
                b_{r,k,n_D} = j ; − index of occasion for candidate PDSCH reception or SPS
                PDSCH release associated with row r
                R = R\r;
                B = B∪b_{r,k,n_D} ;
            end if
            r = r + 1;
        end while
        M_{A,c} = M_{A,c} ∪ j;
        j=j+N_j;
        Set m to the smallest last OFDM symbol index among all rows of R ;
        end while
        end if
        n_D = n_D +1;
    end while
    end if
    k = k + 1;
end while
        [End of Pseudo-code 5]
```

```
        [Start of Pseudo-code 6]
Set j = o − index of occasion for candidate PDSCH reception or SPS PDSCH release
Set B = Ø
Set M_{A,c} = Ø
Set𝒞 (K_1 ) to the cardinality of set K_1
Set k = 0 − index of slot timing values K_{1,k} in descending order of the slot timing value
s, in set K_1 for serving cell c
while k <𝒞 (K_1 )
    if mod (n_U − K_{1,k} +1, max (n^{μUL−μDL} ,1))= 0
        Set n_D = o − index of a DL slot within an UL slot
        while n_D < max(2^{μDL−μUL} ,1)
            Set R to the set of rows
            Set𝒞 (R) to the cardinality of R
            Set r = 0 − index of row in set R
            if slot n_U starts at a same time as or after a slot for an active DL BWP change on
            serving cell𝒞 or an active UL BWP change on the PCell and slot
            ⌊(n_U − K_{1,k} )·2^{μDL−μUL} ⌋+ n_D is before the slot for the active DL BWP change on serving
            cell𝒞or the active UL BWP change on the PCell
                    continue;
            else
                while r <𝒞 (R)
                    if the UE is provided TDD-UL-DL-ConfigurationCommon or TDD-UL-DL-
                        ConfigDedicated and, for each slot from slot
```

$$\lfloor(n_U − K_{1,k})·2^{μDL−μUL}\rfloor + n_D − N^{repeat}_{PDSCH} + 1 \text{ to slot}\lfloor(n_U − K_{1,k})·2^{μDL−μUL}\rfloor + n_D,$$

-continued

```
            at least one symbol of the PDSCH time resource derived by row r is configured
               as UL where K₁,ₖ is the k-th slot timing value in set K₁ ,
            R = R\r ;
         end if
         r = r + 1;
      end while
      Set𝒞 (R) to the cardinality of R
      Set m to the smallest last OFDM symbol index, as determined by the SLIV,
   among all rows of R
      while R ≠ Ø
         Set r = 0
      while r <𝒞 (R)
            if S ≤ m for start OFDM symbol index S for row r
               b_{r,k,nD} = j + mod(r,N_j); – index of occasion for candidate PDSCH
               reception or SPS PDSCH release associated with row r
               R = R\r ;
               B = B∪b_{r,k,nD} ;
            end if
            r = r + 1;
         end while
         M_{A,c} = M_{A,c} ∪ j;
         j=j+N_j;
         Set m to the smallest last OFDM symbol index among all rows of R ;
         end while
      end if
      n_D = n_D +1;
   end while
   end if
   k = k +1;
end while
      [End of Pseudo-code 6]
```

1-3th Embodiment

The following description provides a method of, if DL SPS is configured for a mini slot level (that is, if a transmission period is smaller than 1 slot), determining a semi-static HARQ-ACK codebook by a terminal when usage of the semi-static HARQ-ACK codebook is configured. If the terminal may or may not receive two or more PDSCHs at an identical OFDM symbol, the terminal considers a time resource assignment table for semi-static HARQ-ACK codebook determination. When the terminal receives a DL SPS configuration, the terminal receives DL SPS transmission period information via an upper signal, and receives time resource assignment information for each transmission period via signal L1 indicating activation. In this case, if a DL SPS transmission period is smaller than a slot including 14 OFDM symbols, the terminal should also consider transmission period information configured via an upper signal, in addition to time resource assignment information indicated via signal L1 for semi-static HARQ-ACK codebook determination.

For example, assuming that a slot includes symbol 0 to symbol 13, the base station has a transmission period of a unit of 7 symbols, and when it is indicated that DL SPS PDSCH is scheduled at symbols 0 to 2 according to time resource assignment information, a first TB is transmitted at symbols 0 to 2, and a second TB is transmitted at symbols 7 to 9, actually via DL SPS PDSCH within one slot. Therefore, if a transmission period is smaller than a slot, the terminal should also consider the transmission period in addition to a time resource assignment table in order to determine a HARQ-ACK codebook in a specific slot. Alternatively, it may also be possible that, in consideration of a modified time resource assignment table, for which a transmission period has been considered, the terminal determines a semi-static HARQ-ACK codebook on the basis of the table. The method is to add a row index in consideration of a transmission period in an existing time resource assignment table. Specifically, the method is to add, if a value obtained by adding "a transmission period X natural number" to an S value exists within a slot in the time resource assignment table, the value to the table. (However, if a PDSCH assignment resource determined by the time resource assignment information on the basis of the value obtained by adding a transmission period X natural number to the S value is beyond the slot, this case is excluded.) For example, when PDSCH scheduling, in which PDSCH start symbol S is 1 and PDSCH length L is 2, is in the table, if a DL SPS PDSCH transmission period is 3, the S value enabling scheduling within the slot may be 4, 7, 10, and 13. However, in consideration that the S value is 13 when PDSCH length L is 2, because a scheduling value is beyond the slot, this case is excluded. Therefore, "S, L=4, 2, 7, 2, 10, 2" is added to the corresponding time resource assignment table, and the terminal determines the semi-static HARQ-ACK codebook on the basis of this table.

According to the above method, if the terminal receives DCI indicating release of DL SPS PDSCH having a transmission period of one slot or less, HARQ-ACK information transmission for the DCI may be considered to be the same as a HARQ-ACK bit index corresponding to the time resource assignment information indicating release of the DL SPS PDSCH. Alternatively, it may be possible to map all HARQ-ACK information relating to the DCI indicating release of the DL SPS PDSCH to all HARQ-ACK bit indices corresponding to the DL SPS PDSCH, so as to transmit the same.

Second Embodiment

Figure 11:
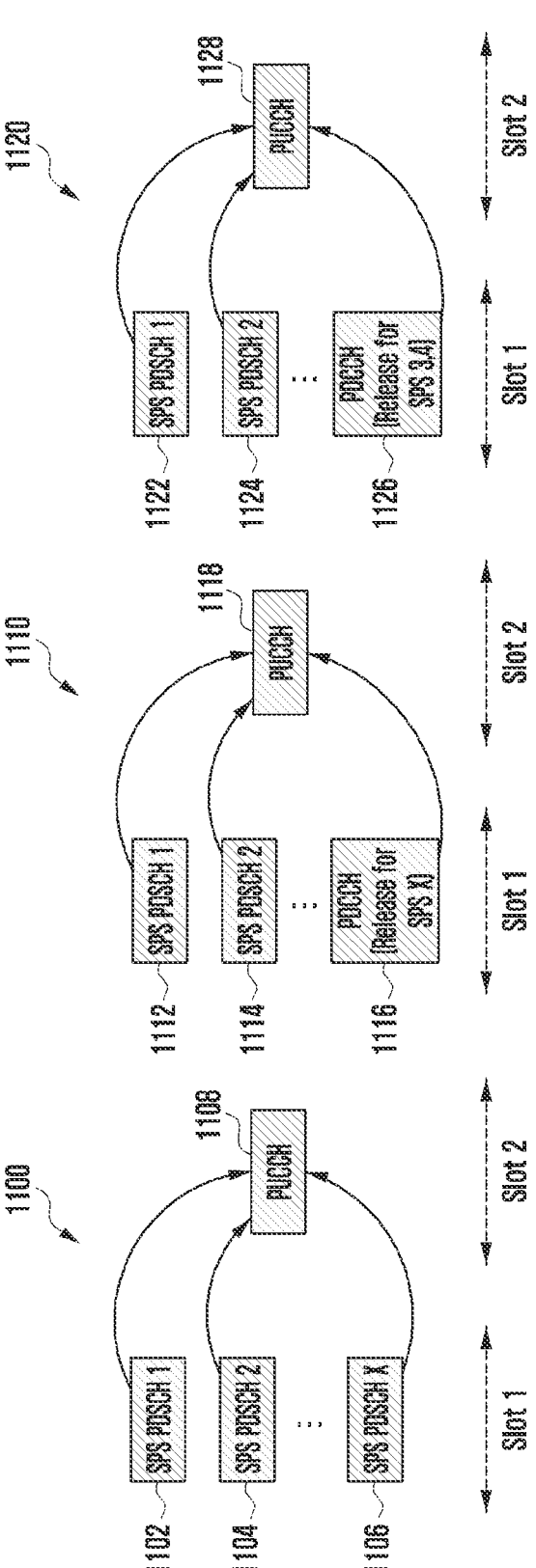
FIG. 11 is a diagram illustrating an example of receiving a plurality of L SPS PDSCHs by a terminal according to an embodiment of the disclosure.

FIG. 11 is a diagram illustrating an example of receiving a plurality of DL SPSs by a terminal according to an embodiment of the disclosure.

Referring to FIG. 11, if a terminal reports, to a base station, that the terminal has the capability of concurrently receiving two or more PDSCHs, or if the base station indicates, via a higher configuration, the terminal to concurrently transmit two or more PDSCHs, the terminal may be able to concurrently receive downlink data transmission according to two or more DL SPSs. The concurrent reception may refer to scheduling of two or more DL SPS transmission resource regions in at least one symbol. In FIG. 11, reference numeral 1100 illustrates that one terminal concurrently receives X number of SPS PDSCHs 1102, 1104, and 1106 at slot 1, and transmits HARQ-ACK information for the X number of SPS PDSCHs via PUCCH 1108 of slot 2. The HARQ-ACK information may refer to HARQ-ACK information for an individual SPS PDSCH or HARQ-ACK information for the entire SPS PDSCH reception. Specifically, the former means that the terminal reports the X pieces of HARQ-ACK feedback information when the terminal receives the X number of SPS PDSCHs, and the latter means that the terminal reports one piece of HARQ-ACK feedback information when the terminal receives the X number of SPS PDSCHs. For example, the latter is a HARQ-ACK bundling scheme and may be a method of reporting NACK when the HARQ-ACK feedback information is NACK due to demodulation and/or decoding failures for at least one of the X number of SPS PDSCHs.

In the former case, a method of configuring HARQ-ACK information for an individual SPS PDSCH in a HARQ-ACK codebook to transmit the HARQ-ACK information is as follows.

Method 1: Adding to SPS Higher Configuration Information

When the terminal receives DL SPS higher configuration information from the base station, index information for DL SPS may be included in DL SPS higher configuration information. A position of a HARQ-ACK codebook position is determined based on the index. Specifically, it may be possible to map sequentially from HARQ-ACK feedback information for a DL SPS resource having a lowest (or highest) value with respect to DL SPSs activated by activation DCI. (HARQ-ACK feedback information for deactivated DL SPS may not be reported.) For example, if the terminal receives three pieces of DL SPS higher configuration information, each DL SPS may have a different index, and may be numbered, such as 1, 2, and 3. For convenience, when the DL SPS is referred to as DL SPS 1, DL SPS 2, or DL SPS 3, if all three DL SPS are activated by the activating DCI, HARQ-ACK codebook cardinality for corresponding DL SPS in a specific slot is 3, and a position of HARQ-ACK feedback information in the HARQ-ACK codebook for each DL SPS may be the same as [HARQ-ACK for DL SPS 1, HARQ-ACK for DL SPS 2, and HARQ-ACK for DL SPS 3].

If only DL SPS 1 and DL SPS 3 are activated, the HARQ-ACK codebook cardinality for the DL SPS is 2, and when it is assumed that the HARQ-ACK feedback information is mapped to the HARQ-ACK codebook sequentially from DL SPS having a low index value, the HARQ-ACK codebook may be configured as [HARQ-ACK for DL SPS 1, and HARQ-ACK for DL SPS 3]. In method 1, a case where index information is included in DL SPS upper signal information has been described, but it may also be possible that the index information is included in signaling L1.

As another example, it may be possible that HARQ-ACK information for DCI including DL SPS release information may be determined by a corresponding DL SPS index in the same manner as the HARQ-ACK information for the DL SPS. Reference numeral 1110 illustrates that, when DCI including SPS release information for 1116 is received in a situation (1112, 1114, . . . , 1116) when a total of X number of SPS PDSCHs have been activated, it may be possible that the HARQ-ACK information for the DCI is bundled and transmitted with HARQ-ACK information for other DL SPS or may be individually transmitted, on PUCCH 1118. When the HARQ-ACK information for DCI is individually transmitted and the number refers to an index, it may be possible that HARQ-ACK bit information is mapped in order of [HARQ-ACK for SPS PDSCH 1, HARQ-ACK for SPS PDSCH 2, . . . , SPS release for SPS PDSCH X] in the HARQ-ACK codebook.

If two or more activated DL SPSs are released 1126 by one DCI as illustrated by reference numeral 1120, it may be possible that HARQ-ACK information for the DCI is mapped to the same information at all HARQ-ACK codebook positions related to the DL SPS index released by the DCI. For example, if SPS PDSCHs 3 and 4 are released by one DCI in a situation where four SPS PDSCHs (SPS PDSCH 1, 1122 SPS PDSCH 2 1124, SPS PDSCH 3, and SPS PDSCH 4 1126) are activated in reference numeral 1120 on PUCCH 1128, it may be possible that HARQ-ACK information (i.e., ACK or NACK for DCI) for the release is repeatedly mapped to information in the HARQ-ACK codebook for SPS PDSCH 3 and SPS PDSCH 4. Therefore, in this situation, the terminal may configure the HARQ-ACK codebook as HARQ-ACK for SPS PDSCH 1, HARQ-ACK for SPS PDSCH 2, HARQ-ACK for SPS PDSCH 3 & 4 release, and HARQ-ACK for SPS PDSCH 3 & 4 release.

The reason for repeatedly transmitting HARQ-ACK information for one DCI is to fix the HARQ-ACK codebook cardinality regardless of DCI reception capable of releasing two or more SPS resources. If only one piece of HARQ-ACK information for DCI capable of releasing two or more SPS resources is transmitted, the HARQ-ACK codebook in the above example may be configured as [HARQ-ACK for SPS PDSCH 1, HARQ-ACK for SPS PDSCH 2, and HARQ-ACK for SPS PDSCH 3&4 release]. However, if the terminal fails to receive the DCI, because HARQ-ACK codebook cardinality information that the base station and the terminal understand may be different from each other, the base station may not properly receive the HARQ-ACK codebook. Therefore, it may be advantageous to fix the HARQ-ACK codebook cardinality regardless of whether DCI is received.

Accordingly, the actual HARQ-ACK codebook cardinality may be determined by the number of activated DL SPS. In the case of DL SPS release, the HARQ-ACK codebook cardinality and bit index mapping may vary depending on the number of activated DL SPS remaining after the terminal reports ACK for the DL SPS release to the base station. As another example, a position in the semi-static HARQ-ACK codebook of the HARQ-ACK information for SPS PDSCH release may be the same as a semi-static HARQ-ACK codebook position for HARQ-ACK information related to reception of the corresponding SPS PDSCH.

Method 2: Activation Order

Method 2 is a method of determining a bit index order of a HARQ-ACK codebook by an order in which DL SPSs are activated. For example, the method includes, in a situation where three DL SPSs are configured via an upper signal, if the DL SPSs are sequentially activated by DCI, allowing respective DL SPSs to be configured as DL SPS 1, DL SPS 2, and DL SPS 3 according to the order in which the activation DCI is received. The method of configuring the HARQ-ACK codebook for corresponding DL SPS PDSCH and DL SPS release may be the same as Method 1. According to the disclosure, in the above example, after DL SPS 2 is released, DL SPS 3 is implicitly changed to DL SPS 2.

After that, the activated DL SPS may be configured as DL SPS 3. If DCI indicating DL SPS activation is transmitted in the same CORESET at the same time, it may be possible that an index of DL SPS is determined based on a smallest control channel element (CCE) index in which the DCI has been transmitted, determined from a PDCCH candidate index in which the DCI has been transmitted, or determined based on a small frequency resource value among frequency resources via which the DCI has been transmitted.

Method 3: Frequency Resource Order/PRB Order

Method 3 is a method of determining a HARQ-ACK codebook bit index position on the basis of a value of a frequency resource at which DL SPS is located. Specifically, the frequency resource value may be a smallest value, a median value, or a large value of a frequency resource region in which the DL SPS (e.g., PDSCH) is transmitted, and a unit thereof may be RB or RE. For example, if a frequency resource value of DL SPS 1 is 5 RB and a frequency resource value of DL SPS 2 is 20 RB, the HARQ-ACK codebook may be mapped in order of [HARQ-ACK for DL SPS 1 and HARQ-ACK for DL SPS 2]. The method of configuring the HARQ-ACK codebook for a corresponding DL SPS PDSCH and DCI for release may be the same as method 1.

Method 4: DCI Field

Method 4 is a method for configuring a semi-static HARQ-ACK codebook via a specific DCI field existing in DCI for activation of SPS. For example, the terminal may determine a position within the codebook for transmission of HARQ-ACK information relating to corresponding SPS reception, via a PUCCH resource indicator, PDSCH-to-HARQ timing, and SLIV. Alternatively, it is also possible to include a separate indicator in DCI, wherein the indicator indicates a position in the codebook for transmission of the HARQ-ACK information for the SPS reception. In this case, the terminal may be able to determine, via corresponding indicator information, the position in the HARQ-ACK codebook for transmission of the HARQ-ACK information with respect to the SPS reception. As another example, if the HARQ-ACK codebook position for transmission of HARQ-ACK information is explicitly indicated in the time resource assignment information table, the terminal may determine the HARQ-ACK codebook position information according to a SLIV index indicated via the DCI. As another example, the terminal may determine a position in the HARQ-ACK codebook for transmission of HARQ-ACK information for DCI indicating corresponding SPS PDSCH reception or SPS release, via the method described in [pseudo-code 3] to [pseudo-code 6].

Figure 12:
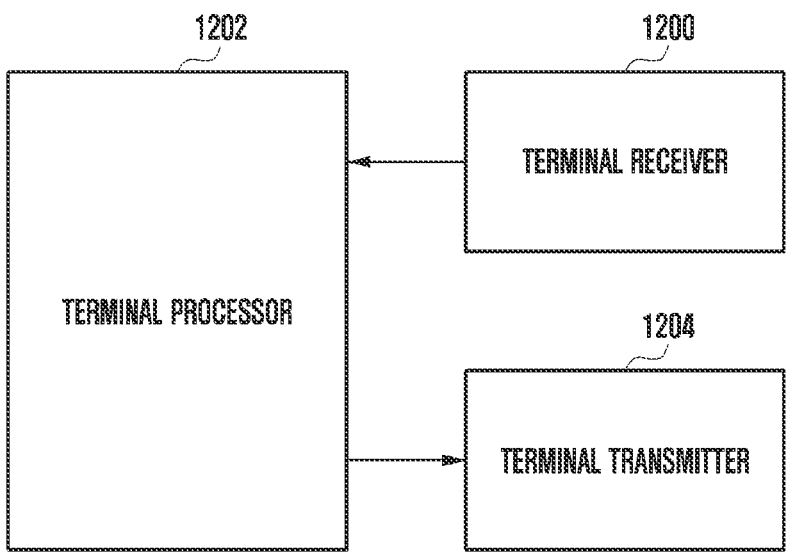
FIG. 12 is a block diagram illustrating a structure of a terminal according to an embodiment of the disclosure.

FIG. 12 is a block diagram illustrating a structure of a terminal according to an embodiment of the disclosure.

Referring to FIG. 12, a terminal of the disclosure may include a terminal receiver 1200, a terminal transmitter 1204, a terminal processor 1202. The terminal receiver 1200 and the terminal transmitter 1204 may collectively be referred to as a transceiver. The transceiver may transmit a signal to or receive a signal from a base station. The signal may include control information and data. To this end, the transceiver may include an RF transmitter that up-converts and amplifies a frequency of a transmitted signal, an RF receiver that low-noise amplifies a received signal and down-converts the frequency, and the like. Also, the transceiver may output, to the terminal processor 1202, a signal received via a radio channel, and may transmit a signal output from the terminal processor 1202 via a radio channel The terminal processor 1202 may control a series of procedures so that the terminal operates according to the above-described embodiments.

Figure 13:
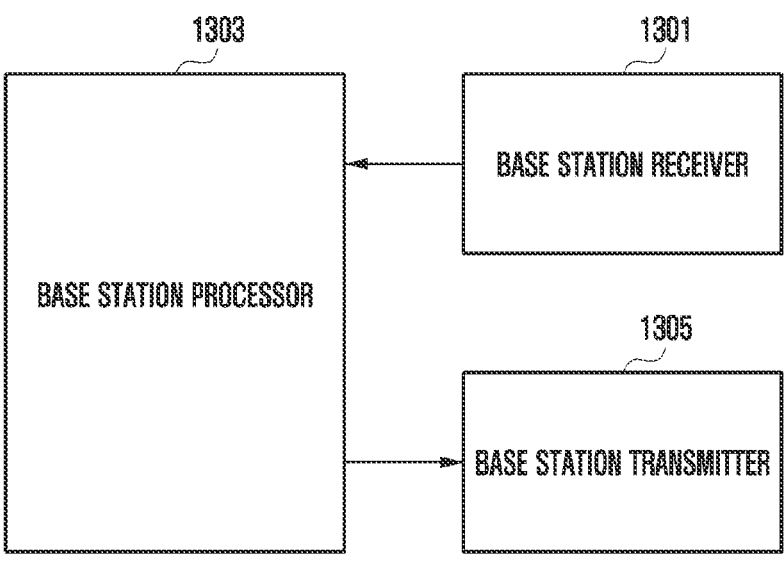
FIG. 13 is a block diagram illustrating a structure of a base station according to an embodiment of the disclosure.

FIG. 13 is a block diagram illustrating a structure of a base station according to an embodiment of the disclosure.

Referring to FIG. 13, in an embodiment, a base station may include at least one of a base station receiver 1301, a base station transmitter 1305, and a base station processor 1303. The base station receiver 1301 and the base station transmitter 1305 may collectively be referred to as a transceiver. The transceiver may transmit a signal to or receive a signal from a terminal. The signal may include control information and data. To this end, the transceiver may include an RF transmitter that up-converts and amplifies a frequency of a transmitted signal, an RF receiver that low-noise amplifies a received signal and down-converts the frequency, and the like. Also, the transceiver may receive a signal via a radio channel and output the signal to the base station processor 1303, and may transmit a signal output from the base station processor 1303 via a radio channel The base station processor 1303 may control a series of procedures so that the base station operates according to the above-described embodiments of the disclosure.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Each of the above embodiments may be combined if necessary for operation. For example, parts of embodiment 1, embodiment 2, and embodiment 3 of the disclosure are combined so as to employ a base station and a terminal. Although the above embodiments are presented on the basis of the NR system, other modifications based on the technical spirit of the above embodiments may be implemented in other systems, such as an FDD or time division duplexing (TDD) LTE system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:

receiving, from a base station, first downlink control information (DCI) scheduling a first physical downlink shared channel (PDSCH) for a unicast, wherein a format of the first DCI is a first DCI format for the unicast;

receiving, from the base station, second DCI scheduling a second PDSCH for a multicast, wherein a format of the second DCI is a second DCI format for the multicast;

receiving, from the base station, the first PDSCH for the unicast and the second PDSCH for the multicast, wherein the first PDSCH for the unicast and the second PDSCH for the multicast overlap each other in at least one symbol and are located in non-overlapping frequency resources, respectively;

identifying a first semi-static hybrid automatic repeat request acknowledgement (HARQ-ACK) codebook for the first PDSCH for the unicast and a second semi-static HARQ-ACK codebook for the second PDSCH for the multicast;

concatenating the first semi-static HARQ-ACK codebook followed by the second semi-static HARQ-ACK codebook to obtain a semi-static HARQ-ACK codebook; and transmitting, to the base station, the semi-static HARQ-ACK codebook.

2. The method of claim 1, wherein a first set of time domain allocation information for the first PDSCH and a second set of time domain allocation information for the second PDSCH are configured via higher layer signaling.

3. The method of claim 1, wherein a radio network temporary identifier (RNTI) for the second DCI corresponds to an RNTI for the multicast.

4. The method of claim 1, further comprising:

transmitting, to the base station, capability information indicating a capability of receiving frequency division multiplexed (FDMed) PDSCHs.

5. A method performed by a base station in a communication system, the method comprising:

transmitting, to a terminal, first downlink control information (DCI) scheduling a first physical downlink shared channel (PDSCH) for a unicast, wherein a format of the first DCI is a first DCI format for the unicast;

transmitting, to the terminal, second DCI scheduling a second PDSCH for a multicast, wherein a format of the second DCI is a second DCI format for the multicast;

transmitting, to the terminal, the first PDSCH for the unicast and the second PDSCH for the multicast, wherein the first PDSCH for the unicast and the second PDSCH for the multicast overlap each other in at least one symbol and are located in non-overlapping frequency resources, respectively; and receiving, from the terminal, a semi-static hybrid automatic repeat request acknowledgement (HARQ-ACK) codebook, wherein the semi-static HARQ-ACK codebook includes a first semi-static HARQ-ACK codebook for the first PDSCH for the unicast followed by a second semi-static HARQ-ACK codebook for the second PDSCH for the multicast.

6. The method of claim 5, wherein configurations on a first set of time domain allocation information for the first PDSCH and a second set of time domain allocation information for the second PDSCH are transmitted via higher layer signaling.

7. The method of claim 5, wherein a radio network temporary identifier (RNTI) for the second DCI corresponds to an RNTI for the multicast.

8. The method of claim 5, further comprising:

receiving, from the terminal, capability information indicating a capability of receiving frequency division multiplexed (FDMed) PDSCHs.

9. A terminal in a communication system, the terminal comprising:

a transceiver; and a controller coupled with the transceiver and configured to:

receive, from a base station, first downlink control information (DCI) scheduling a first physical downlink shared channel (PDSCH) for a unicast, wherein a format of the first DCI is a first DCI format for the unicast, receive, from the base station, second DCI scheduling a second PDSCH for a multicast, wherein a format of the second DCI is a second DCI format for the multicast, receive, from the base station, the first PDSCH for the unicast and the second PDSCH for the multicast, wherein the first PDSCH for the unicast and the second PDSCH for the multicast overlap each other in at least one symbol and are located in non-overlapping frequency resources, respectively, identify a first semi-static hybrid automatic repeat request acknowledgement (HARQ-ACK) codebook for the first PDSCH for the unicast and a second semi-static HARQ-ACK codebook for the second PDSCH for the multicast, concatenate the first semi-static HARQ-ACK codebook followed by the second semi-static HARQ-ACK codebook to obtain a semi-static HARQ-ACK codebook, and transmit, to the base station, the semi-static HARQ-ACK codebook.

10. The terminal of claim 9, wherein a first set of time domain allocation information for the first PDSCH and a second set of time domain allocation information for the second PDSCH are configured via higher layer signaling.

11. The terminal of claim 9, wherein a radio network temporary identifier (RNTI) for the second DCI corresponds to an RNTI for the multicast.

12. The terminal of claim 9, wherein the controller is further configured to transmit, to the base station, capability information indicating a capability of receiving frequency division multiplexed (FDMed) PDSCHs.

13. A base station in a communication system, the base station comprising:

a transceiver; and a controller coupled with the transceiver and configured to:

transmit, to a terminal, first downlink control information (DCI) scheduling a first physical downlink shared channel (PDSCH) for a unicast, wherein a format of the first DCI is a first DCI format for the unicast, transmit, to the terminal, second DCI scheduling a second PDSCH for a multicast, wherein a format of the second DCI is a second DCI format for the multicast, transmit, to the terminal, the first PDSCH for the unicast and the second PDSCH for the multicast, wherein the first PDSCH for the unicast and the second PDSCH for the multicast overlap each other in at least one symbol and are located in non-overlapping frequency resources, respectively, and receive, from the terminal, a semi-static hybrid automatic repeat request acknowledgement (HARQ-ACK) codebook, wherein the semi-static HARQ-ACK codebook includes a first semi-static HARQ-ACK codebook for the first PDSCH for the unicast followed by a second semi-static HARQ-ACK codebook for the second PDSCH for the multicast.

14. The base station of claim 13, wherein configurations on a first set of time domain allocation information for the first PDSCH and a second set of time domain allocation information for the second PDSCH are transmitted via higher layer signaling.

15. The base station of claim 13,
wherein a radio network temporary identifier (RNTI) for the second DCI corresponds to an RNTI for the multicast.

16. The base station of claim 13,
wherein the controller is further configured to receive, from the terminal, capability information indicating a capability of receiving frequency division multiplexed (FDMed) PDSCHs.

\* \* \* \* \*